US012019745B2

(12) United States Patent
Moore et al.

(10) Patent No.: US 12,019,745 B2
(45) Date of Patent: *Jun. 25, 2024

(54) CYBERANALYSIS WORKFLOW ACCELERATION

(71) Applicant: Centripetal Networks, LLC, Portsmouth, NH (US)

(72) Inventors: Sean Moore, Hollis, NH (US); Jonathan R. Rogers, Hampton Falls, NH (US); Jess P. Parnell, Grayson, GA (US); Zachary Ehnerd, Herndon, VA (US)

(73) Assignee: Centripetal Networks, LLC, Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/370,484

(22) Filed: Sep. 20, 2023

(65) Prior Publication Data
US 2024/0004996 A1    Jan. 4, 2024

Related U.S. Application Data

(63) Continuation of application No. 18/082,950, filed on Dec. 16, 2022, now Pat. No. 11,797,671, which is a (Continued)

(51) Int. Cl.
H04L 29/06     (2006.01)
G06F 21/55     (2013.01)
(Continued)

(52) U.S. Cl.
CPC .......... G06F 21/554 (2013.01); G06N 20/00 (2019.01); H04L 63/1416 (2013.01);
(Continued)

(58) Field of Classification Search
CPC .. G06F 21/554; G06F 2221/034; G06N 20/00
See application file for complete search history.

(56) References Cited

U.S. PATENT DOCUMENTS 5,857,190 A    1/1999   Brown
6,098,172 A    8/2000   Coss et al.
(Continued)

FOREIGN PATENT DOCUMENTS

AU    2005328336 B2    9/2011
AU    2006230171 B2    6/2012
(Continued)

OTHER PUBLICATIONS

"Cisco ACNS Software Configuration Guide for Centrally Managed Deployments," Release 5.5. Text Part No. OL-9136-01, Cisco Systems, Inc., 2006, 944 pages.
(Continued)

Primary Examiner — Evans Desrosiers
(74) Attorney, Agent, or Firm — Banner & Witcoff, Ltd.

(57) ABSTRACT

A cyber threat intelligence (CTI) gateway device may receive rules for filtering TCP/IP packet communications events that are configured to cause the CTI gateway device to identify communications corresponding to indicators, signatures, and behavioral patterns of network threats. The CTI gateway device may receive packets that compose endpoint-to-endpoint communication events and, for each event, may determine that the event corresponds to criteria specified by a filtering rule. The criteria may correspond to one or more of the network threat indicators, signatures, and behavioral patterns. The CTI gateway may create a log of the threat event and forward the threat event log to a task queue managed by a cyberanalysis workflow application. Human cyberanalysts use the cyberanalysis workflow application to service the task queue by removing the task at the front of the queue, investigating the threat event, and deciding
(Continued)

* Illustrative functional diagram of a Cyber Threat Intelligence (CTI) operational system whether the event is a reportable finding that should be reported to the proper authorities. In order to improve the efficiency of the workflow process, tasks in the queue are ordered by the likelihood, or probability, that cyberanalysts will determine the associated threat events to be reportable findings; thus, high-likelihood events are investigated first. Likelihoods are computed using human-designed algorithms and machine-learned algorithms that are applied to characteristics of the events. Low-likelihood events may be dropped from the work queue to further improve efficiency.

34 Claims, 7 Drawing Sheets

Related U.S. Application Data continuation of application No. 16/584,084, filed on Sep. 26, 2019, now Pat. No. 11,574,047, which is a continuation of application No. 16/030,354, filed on Jul. 9, 2018, now Pat. No. 10,503,899.

(60) Provisional application No. 62/530,543, filed on Jul. 10, 2017.

(51) Int. Cl.
  *G06N 20/00* (2019.01)
  *H04L 9/40* (2022.01)
(52) U.S. Cl.
  CPC .... *G06F 2221/034* (2013.01); *H04L 63/1441* (2013.01); *H04L 63/166* (2013.01)

(56) References Cited

U.S. PATENT DOCUMENTS

| | | | |
|---|---|---|---|
| 6,147,976 A | 11/2000 | Shand et al. | |
| 6,226,372 B1 | 5/2001 | Beebe et al. | |
| 6,279,113 B1 | 8/2001 | Vaidya | |
| 6,317,837 B1 | 11/2001 | Kenworthy | |
| 6,484,261 B1 | 11/2002 | Wiegel | |
| 6,611,875 B1 | 8/2003 | Chopra et al. | |
| 6,662,235 B1 | 12/2003 | Callis et al. | |
| 6,678,827 B1 | 1/2004 | Rothermel et al. | |
| 6,826,694 B1 | 11/2004 | Dutta et al. | |
| 6,907,042 B1 | 6/2005 | Oguchi | |
| 6,971,028 B1 | 11/2005 | Lyle et al. | |
| 7,089,581 B1 | 8/2006 | Nagai et al. | |
| 7,095,716 B1 | 8/2006 | Ke et al. | |
| 7,107,613 B1 | 9/2006 | Chen et al. | |
| 7,143,438 B1 | 11/2006 | Coss et al. | |
| 7,152,240 B1 | 12/2006 | Green et al. | |
| 7,185,368 B2 | 2/2007 | Copeland, III | |
| 7,215,637 B1 | 5/2007 | Ferguson et al. | |
| 7,225,269 B2 | 5/2007 | Watanabe | |
| 7,227,842 B1 | 6/2007 | Ji et al. | |
| 7,237,267 B2 | 6/2007 | Rayes et al. | |
| 7,263,099 B1 | 8/2007 | Woo et al. | |
| 7,296,288 B1 | 11/2007 | Hill et al. | |
| 7,299,353 B2 | 11/2007 | Le Pennec et al. | |
| 7,331,061 B1 | 2/2008 | Ramsey et al. | |
| 7,478,429 B2 | 1/2009 | Lyon | |
| 7,499,412 B2 | 3/2009 | Matityahu et al. | |
| 7,539,186 B2 | 5/2009 | Aerrabotu et al. | |
| 7,594,270 B2 | 9/2009 | Church et al. | |
| 7,610,621 B2 | 10/2009 | Turley et al. | |
| 7,684,400 B2 | 3/2010 | Govindarajan et al. | |
| 7,710,885 B2 | 5/2010 | Ilnicki et al. | |
| 7,721,084 B2 | 5/2010 | Salminen et al. | |
| 7,792,775 B2 | 9/2010 | Matsuda | |
| 7,814,158 B2 | 10/2010 | Malik | |
| 7,814,546 B1 | 10/2010 | Strayer et al. | |
| 7,818,794 B2 | 10/2010 | Wittman | |
| 7,849,502 B1 | 12/2010 | Bloch et al. | |
| 7,913,303 B1 | 3/2011 | Rouland et al. | |
| 7,954,143 B2 | 5/2011 | Aaron | |
| 8,004,994 B1 | 8/2011 | Darisi et al. | |
| 8,009,566 B2 | 8/2011 | Zuk et al. | |
| 8,037,517 B2 | 10/2011 | Fulp et al. | |
| 8,042,167 B2 | 10/2011 | Fulp et al. | |
| 8,117,655 B2 | 2/2012 | Spielman | |
| 8,156,206 B2 | 4/2012 | Kiley et al. | |
| 8,156,553 B1 | 4/2012 | Church et al. | |
| 8,176,561 B1 | 5/2012 | Hurst et al. | |
| 8,219,675 B2 | 7/2012 | Ivershen | |
| 8,271,645 B2 | 9/2012 | Rajan et al. | |
| 8,306,994 B2 | 11/2012 | Kenworthy | |
| 8,307,029 B2 | 11/2012 | Davis et al. | |
| 8,331,234 B1 | 12/2012 | Newton et al. | |
| 8,402,543 B1 | 3/2013 | Ranjan et al. | |
| 8,422,391 B2 | 4/2013 | Zhu | |
| 8,495,725 B2 | 7/2013 | Ahn | |
| 8,510,821 B1 | 8/2013 | Brandwine et al. | |
| 8,560,624 B1 | 10/2013 | Duan et al. | |
| 8,726,379 B1 | 5/2014 | Stiansen et al. | |
| 8,789,135 B1 | 7/2014 | Pani | |
| 8,806,638 B1 | 8/2014 | Mani | |
| 8,832,832 B1 | 9/2014 | Visbal | |
| 8,850,571 B2 | 9/2014 | Staniford et al. | |
| 8,856,926 B2 | 10/2014 | Narayanaswamy et al. | |
| 8,935,785 B2 | 1/2015 | Pandrangi | |
| 9,094,445 B2 | 7/2015 | Moore et al. | |
| 9,124,552 B2 | 9/2015 | Moore | |
| 9,137,205 B2 | 9/2015 | Rogers et al. | |
| 9,154,446 B2 | 10/2015 | Gemelli et al. | |
| 9,160,713 B2 | 10/2015 | Moore | |
| 9,172,627 B2 | 10/2015 | Kjendal et al. | |
| 9,258,321 B2 | 2/2016 | Amsler et al. | |
| 9,306,965 B1* | 4/2016 | Grossman | H04L 63/1425 |
| 9,392,003 B2 | 7/2016 | Amsler | |
| 9,419,942 B1 | 8/2016 | Buruganahalli et al. | |
| 9,531,672 B1 | 12/2016 | Li et al. | |
| 9,634,911 B2 | 4/2017 | Meloche | |
| 9,686,193 B2 | 6/2017 | Moore | |
| 9,934,379 B2 | 4/2018 | Monrose et al. | |
| 10,187,482 B2 | 1/2019 | Miller et al. | |
| 10,503,899 B2 | 12/2019 | Moore et al. | |
| 10,681,070 B2 | 6/2020 | Khalil et al. | |
| 10,692,012 B2 | 6/2020 | Ronen et al. | |
| 2001/0039579 A1 | 11/2001 | Trcka et al. | |
| 2001/0039624 A1 | 11/2001 | Kellum | |
| 2002/0016858 A1 | 2/2002 | Sawada et al. | |
| 2002/0038339 A1 | 3/2002 | Xu | |
| 2002/0049899 A1 | 4/2002 | Kenworthy | |
| 2002/0083345 A1 | 6/2002 | Halliday et al. | |
| 2002/0112188 A1 | 8/2002 | Syvanne | |
| 2002/0152209 A1 | 10/2002 | Merugu et al. | |
| 2002/0164962 A1 | 11/2002 | Mankins et al. | |
| 2002/0165949 A1 | 11/2002 | Na et al. | |
| 2002/0186683 A1 | 12/2002 | Buck et al. | |
| 2002/0198981 A1 | 12/2002 | Corl et al. | |
| 2003/0005122 A1 | 1/2003 | Freimuth et al. | |
| 2003/0014665 A1 | 1/2003 | Anderson et al. | |
| 2003/0018591 A1 | 1/2003 | Komisky | |
| 2003/0035370 A1 | 2/2003 | Brustoloni | |
| 2003/0051026 A1 | 3/2003 | Carter et al. | |
| 2003/0088787 A1 | 5/2003 | Egevang | |
| 2003/0097590 A1 | 5/2003 | Syvanne | |
| 2003/0105976 A1 | 6/2003 | Copeland | |
| 2003/0120622 A1 | 6/2003 | Nurmela et al. | |
| 2003/0123456 A1 | 7/2003 | Denz et al. | |
| 2003/0142681 A1 | 7/2003 | Chen et al. | |
| 2003/0145225 A1 | 7/2003 | Bruton et al. | |
| 2003/0154297 A1 | 8/2003 | Suzuki et al. | |
| 2003/0154399 A1 | 8/2003 | Zuk et al. | |
| 2003/0188192 A1 | 10/2003 | Tang et al. | |
| 2003/0212900 A1 | 11/2003 | Liu et al. | |
| 2003/0220940 A1 | 11/2003 | Futoransky et al. | |
| 2004/0010712 A1 | 1/2004 | Hui et al. | |
| 2004/0015719 A1 | 1/2004 | Lee et al. | |
| 2004/0073655 A1 | 4/2004 | Kan et al. | |
| 2004/0088542 A1 | 5/2004 | Daude et al. | |

(56) References Cited

U.S. PATENT DOCUMENTS

| | | |
|---|---|---|
| 2004/0093513 A1 | 5/2004 | Cantrell et al. |
| 2004/0098511 A1 | 5/2004 | Lin et al. |
| 2004/0114518 A1 | 6/2004 | MacFaden et al. |
| 2004/0123220 A1 | 6/2004 | Johnson et al. |
| 2004/0131056 A1 | 7/2004 | Dark |
| 2004/0148520 A1 | 7/2004 | Talpade et al. |
| 2004/0151155 A1 | 8/2004 | Jouppi |
| 2004/0172529 A1 | 9/2004 | Culbert |
| 2004/0172557 A1 | 9/2004 | Nakae et al. |
| 2004/0177139 A1 | 9/2004 | Schuba et al. |
| 2004/0181690 A1 | 9/2004 | Rothermel et al. |
| 2004/0193943 A1 | 9/2004 | Angelino et al. |
| 2004/0199629 A1 | 10/2004 | Bomer et al. |
| 2004/0205360 A1 | 10/2004 | Norton et al. |
| 2004/0250124 A1 | 12/2004 | Chesla et al. |
| 2005/0010765 A1 | 1/2005 | Swander et al. |
| 2005/0024189 A1 | 2/2005 | Weber |
| 2005/0071650 A1 | 3/2005 | Jo et al. |
| 2005/0076227 A1 | 4/2005 | Kang et al. |
| 2005/0108557 A1 | 5/2005 | Kayo et al. |
| 2005/0114704 A1 | 5/2005 | Swander |
| 2005/0117576 A1 | 6/2005 | McDysan et al. |
| 2005/0125697 A1 | 6/2005 | Tahara |
| 2005/0138204 A1 | 6/2005 | Iyer et al. |
| 2005/0138353 A1 | 6/2005 | Spies et al. |
| 2005/0141537 A1 | 6/2005 | Kumar et al. |
| 2005/0183140 A1 | 8/2005 | Goddard |
| 2005/0229246 A1 | 10/2005 | Rajagopal et al. |
| 2005/0249214 A1 | 11/2005 | Peng |
| 2005/0251570 A1 | 11/2005 | Heasman et al. |
| 2005/0283823 A1 | 12/2005 | Okajo et al. |
| 2005/0286522 A1 | 12/2005 | Paddon et al. |
| 2006/0031928 A1 | 2/2006 | Conley et al. |
| 2006/0048142 A1 | 3/2006 | Roese et al. |
| 2006/0053491 A1 | 3/2006 | Khuti et al. |
| 2006/0070122 A1 | 3/2006 | Bellovin |
| 2006/0080733 A1 | 4/2006 | Khosmood et al. |
| 2006/0085849 A1 | 4/2006 | Culbert |
| 2006/0104202 A1 | 5/2006 | Reiner |
| 2006/0114899 A1 | 6/2006 | Toumura et al. |
| 2006/0133377 A1 | 6/2006 | Jain |
| 2006/0136987 A1 | 6/2006 | Okuda |
| 2006/0137009 A1 | 6/2006 | Chesla |
| 2006/0146879 A1 | 7/2006 | Anthias et al. |
| 2006/0159028 A1 | 7/2006 | Curran-Gray et al. |
| 2006/0195896 A1 | 8/2006 | Fulp et al. |
| 2006/0212572 A1 | 9/2006 | Afek et al. |
| 2006/0236392 A1 | 10/2006 | Thomas et al. |
| 2006/0248580 A1 | 11/2006 | Fulp et al. |
| 2006/0262798 A1 | 11/2006 | Joshi et al. |
| 2007/0056038 A1 | 3/2007 | Lok |
| 2007/0083924 A1 | 4/2007 | Lu |
| 2007/0118894 A1 | 5/2007 | Bhatia |
| 2007/0147380 A1 | 6/2007 | Ormazabal et al. |
| 2007/0211644 A1 | 9/2007 | Ottamalika et al. |
| 2007/0240208 A1 | 10/2007 | Yu et al. |
| 2007/0291789 A1 | 12/2007 | Kutt et al. |
| 2008/0005795 A1 | 1/2008 | Acharya et al. |
| 2008/0028467 A1 | 1/2008 | Kommareddy et al. |
| 2008/0034429 A1* | 2/2008 | Schneider ............... G06F 21/51 726/23 |
| 2008/0043739 A1 | 2/2008 | Suh et al. |
| 2008/0072307 A1 | 3/2008 | Maes |
| 2008/0077705 A1 | 3/2008 | Li et al. |
| 2008/0080493 A1 | 4/2008 | Weintraub et al. |
| 2008/0086435 A1 | 4/2008 | Chesla |
| 2008/0101234 A1 | 5/2008 | Nakil et al. |
| 2008/0163333 A1 | 7/2008 | Kasralikar |
| 2008/0201772 A1 | 8/2008 | Mondaeev et al. |
| 2008/0229415 A1 | 9/2008 | Kapoor et al. |
| 2008/0235755 A1 | 9/2008 | Blaisdell et al. |
| 2008/0279196 A1 | 11/2008 | Friskney et al. |
| 2008/0301765 A1 | 12/2008 | Nicol et al. |
| 2008/0313738 A1 | 12/2008 | Enderby |
| 2008/0320116 A1 | 12/2008 | Briggs |
| 2009/0028160 A1 | 1/2009 | Eswaran et al. |
| 2009/0138938 A1 | 5/2009 | Harrison et al. |
| 2009/0144819 A1 | 6/2009 | Babbar et al. |
| 2009/0150972 A1 | 6/2009 | Moon et al. |
| 2009/0172800 A1 | 7/2009 | Wool |
| 2009/0178139 A1 | 7/2009 | Stute et al. |
| 2009/0222877 A1 | 9/2009 | Diehl et al. |
| 2009/0240698 A1 | 9/2009 | Shukla et al. |
| 2009/0262723 A1 | 10/2009 | Pelletier et al. |
| 2009/0262741 A1 | 10/2009 | Jungck et al. |
| 2009/0300759 A1 | 12/2009 | Wang et al. |
| 2009/0328219 A1 | 12/2009 | Narayanaswamy |
| 2010/0011433 A1 | 1/2010 | Harrison et al. |
| 2010/0011434 A1 | 1/2010 | Kay |
| 2010/0082811 A1 | 4/2010 | Van Der Merwe et al. |
| 2010/0095367 A1 | 4/2010 | Narayanaswamy |
| 2010/0107240 A1 | 4/2010 | Thaler et al. |
| 2010/0115621 A1 | 5/2010 | Staniford et al. |
| 2010/0132027 A1 | 5/2010 | Ou |
| 2010/0195503 A1 | 8/2010 | Raleigh |
| 2010/0199346 A1 | 8/2010 | Ling et al. |
| 2010/0202299 A1 | 8/2010 | Strayer et al. |
| 2010/0211678 A1 | 8/2010 | McDysan et al. |
| 2010/0232445 A1 | 9/2010 | Bellovin |
| 2010/0242098 A1 | 9/2010 | Kenworthy |
| 2010/0268799 A1 | 10/2010 | Maestas |
| 2010/0281536 A1 | 11/2010 | Richards et al. |
| 2010/0296441 A1 | 11/2010 | Barkan |
| 2010/0303240 A1 | 12/2010 | Beachem et al. |
| 2011/0055916 A1 | 3/2011 | Ahn |
| 2011/0055923 A1 | 3/2011 | Thomas |
| 2011/0088092 A1 | 4/2011 | Nguyen et al. |
| 2011/0141900 A1 | 6/2011 | Jayawardena et al. |
| 2011/0154470 A1 | 6/2011 | Grimes et al. |
| 2011/0185055 A1 | 7/2011 | Nappier et al. |
| 2011/0214157 A1 | 9/2011 | Korsunsky et al. |
| 2011/0270956 A1 | 11/2011 | McDysan et al. |
| 2011/0277034 A1 | 11/2011 | Hanson |
| 2012/0023576 A1 | 1/2012 | Sorensen et al. |
| 2012/0084866 A1 | 4/2012 | Stolfo |
| 2012/0106354 A1 | 5/2012 | Pleshek et al. |
| 2012/0110656 A1 | 5/2012 | Santos et al. |
| 2012/0113987 A1 | 5/2012 | Riddoch et al. |
| 2012/0192278 A1 | 7/2012 | Kito et al. |
| 2012/0240135 A1 | 9/2012 | Risbood et al. |
| 2012/0240185 A1 | 9/2012 | Kapoor et al. |
| 2012/0264443 A1 | 10/2012 | Ng et al. |
| 2012/0314617 A1 | 12/2012 | Erichsen et al. |
| 2012/0331543 A1 | 12/2012 | Bostrom et al. |
| 2013/0007257 A1 | 1/2013 | Ramaraj et al. |
| 2013/0047020 A1 | 2/2013 | Hershko et al. |
| 2013/0059527 A1 | 3/2013 | Hasesaka et al. |
| 2013/0061294 A1 | 3/2013 | Kenworthy |
| 2013/0091539 A1 | 4/2013 | Khurana et al. |
| 2013/0104236 A1 | 4/2013 | Ray et al. |
| 2013/0117852 A1 | 5/2013 | Stute |
| 2013/0139236 A1 | 5/2013 | Rubinstein et al. |
| 2013/0254766 A1 | 9/2013 | Zuo et al. |
| 2013/0291100 A1 | 10/2013 | Ganapathy et al. |
| 2013/0305311 A1 | 11/2013 | Puttaswamy Naga et al. |
| 2014/0075510 A1 | 3/2014 | Sonoda et al. |
| 2014/0082204 A1 | 3/2014 | Shankar et al. |
| 2014/0082730 A1 | 3/2014 | Vashist et al. |
| 2014/0115654 A1 | 4/2014 | Rogers et al. |
| 2014/0150051 A1 | 5/2014 | Bharali et al. |
| 2014/0201123 A1 | 7/2014 | Ahn et al. |
| 2014/0215561 A1 | 7/2014 | Roberson et al. |
| 2014/0215574 A1 | 7/2014 | Erb et al. |
| 2014/0245423 A1 | 8/2014 | Lee |
| 2014/0259170 A1 | 9/2014 | Amsler |
| 2014/0281030 A1 | 9/2014 | Cui et al. |
| 2014/0283004 A1 | 9/2014 | Moore |
| 2014/0283030 A1 | 9/2014 | Moore et al. |
| 2014/0317397 A1 | 10/2014 | Martini |
| 2014/0317737 A1 | 10/2014 | Shin et al. |
| 2014/0337613 A1 | 11/2014 | Martini |
| 2014/0365372 A1 | 12/2014 | Ross et al. |
| 2014/0366132 A1 | 12/2014 | Stiansen et al. |
| 2015/0013530 A1 | 1/2015 | Sato et al. |

(56) References Cited

U.S. PATENT DOCUMENTS

| | | | |
|---|---|---|---|
| 2015/0033336 | A1 | 1/2015 | Wang et al. |
| 2015/0052601 | A1 | 2/2015 | White et al. |
| 2015/0106930 | A1 | 4/2015 | Honda et al. |
| 2015/0128274 | A1 | 5/2015 | Giokas |
| 2015/0135320 | A1 | 5/2015 | Coskun |
| 2015/0135325 | A1 | 5/2015 | Stevens et al. |
| 2015/0207809 | A1 | 7/2015 | Macaulay |
| 2015/0237012 | A1 | 8/2015 | Moore |
| 2015/0244734 | A1 | 8/2015 | Olson et al. |
| 2015/0256431 | A1 | 9/2015 | Buchanan et al. |
| 2015/0304354 | A1 | 10/2015 | Rogers et al. |
| 2015/0334125 | A1 | 11/2015 | Bartos et al. |
| 2015/0341389 | A1 | 11/2015 | Kurakami |
| 2015/0347246 | A1 | 12/2015 | Matsui et al. |
| 2015/0350229 | A1 | 12/2015 | Mitchell |
| 2015/0372977 | A1 | 12/2015 | Yin |
| 2015/0373043 | A1 | 12/2015 | Wang et al. |
| 2016/0020968 | A1 | 1/2016 | Aumann et al. |
| 2016/0028751 | A1 | 1/2016 | Cruz Mota et al. |
| 2016/0065611 | A1 | 3/2016 | Fakeri-Tabrizi et al. |
| 2016/0112443 | A1 | 4/2016 | Grossman et al. |
| 2016/0119365 | A1 | 4/2016 | Barel |
| 2016/0127417 | A1 | 5/2016 | Janssen |
| 2016/0191558 | A1 | 6/2016 | Davison |
| 2016/0205069 | A1 | 7/2016 | Blocher et al. |
| 2016/0219065 | A1 | 7/2016 | Dasgupta et al. |
| 2016/0226895 | A1 | 8/2016 | Huang et al. |
| 2016/0285706 | A1 | 9/2016 | Rao |
| 2016/0294870 | A1 | 10/2016 | Banerjee et al. |
| 2016/0366099 | A1 | 12/2016 | Jordan |
| 2017/0223046 | A1 | 8/2017 | Singh |
| 2017/0272469 | A1 | 9/2017 | Kraemer et al. |
| 2018/0248902 | A1 | 8/2018 | D Nil-Dumitrescu et al. |
| 2018/0270261 | A1* | 9/2018 | Pande ................... G06N 7/01 |

FOREIGN PATENT DOCUMENTS

| | | | |
|---|---|---|---|
| CA | 2600236 | A1 | 10/2006 |
| CN | 105337993 | A | 2/2016 |
| CN | 106815125 | A | 6/2017 |
| EP | 1006701 | A2 | 6/2000 |
| EP | 1313290 | A1 | 5/2003 |
| EP | 1484884 | A2 | 12/2004 |
| EP | 1677484 | A2 | 7/2006 |
| EP | 2385676 | A1 | 11/2011 |
| EP | 2498442 | A1 | 9/2012 |
| EP | 1864226 | B1 | 5/2013 |
| KR | 20010079361 | A | 8/2001 |
| WO | 2005046145 | A1 | 5/2005 |
| WO | 2006093557 | A2 | 9/2006 |
| WO | 2006105093 | A2 | 10/2006 |
| WO | 2007109541 | A2 | 9/2007 |
| WO | 2011038420 | A2 | 3/2011 |
| WO | 2012146265 | A1 | 11/2012 |
| WO | 2017018926 | A1 | 2/2017 |

OTHER PUBLICATIONS

"Control Plane Policing Implementation Best Practices"; Cisco Systems; Mar. 13, 2013; <https://web.archive.org/web/20130313135143/http:www.cisco.com/web/about/security/intelligence/coppwp_gs.html>.
"Examining SSL-encrypted Communications: Netronome SSL InspectorTM Solution Overview," Jan. 1, 2008, XP055036015, retrieved from <http://www.infosecurityproductsguide.com/technology/2008/Netronome_Examining_SSL-encrypted_Communications.pdf>, 8 pages.
Sep. 11, 2006—(WO) Written Opinion of the International Searching Authority—App PCT/US05/47008.
Aug. 31, 2007—(EP) Communication Pursuant to Rules 109 and 110—App 05857614.1.
Jul. 3, 2008—(WO) Written Opinion of the International Searching Authority—App PCT/US06/11291.
Jun. 24, 2009—U.S. Office Action—U.S. Appl. No. 11/390,976.
Sep. 14, 2009—U.S. Office Action—U.S. Appl. No. 11/316,331.
Apr. 29, 2010—U.S. Interview Summary—U.S. Appl. No. 11/390,976.
Aug. 20, 2010—(AU) Office Action—App 2005328336.
Jun. 23, 2010—U.S. Final Rejection—U.S. Appl. No. 11/316,331.
Mar. 26, 2010—U.S. Final Rejection—U.S. Appl. No. 11/390,976.
Sep. 10, 2010—(AU) Office Action—App 2006230171.
Sep. 30, 2010—U.S. Office Action—U.S. Appl. No. 11/390,976.
Apr. 27, 2011—(WO) International Search Report and Written Opinion—App PCT/US2010/054520.
Aug. 25, 2011—U.S. Non Final Rejection—U.S. Appl. No. 12/871,806.
Feb. 14, 2011—(EP) Search Report—App 06758213.0.
Jun. 9, 2011—U.S. Notice of Allowance—U.S. Appl. No. 11/390,976.
Mar. 3, 2011—(EP) Communication Pursuant to Rules 70(2) and 70a(2)—App 06758213.0.
Mar. 4, 2011—U.S. Notice of Allowance—U.S. Appl. No. 11/316,331.
Nov. 11, 2011—(AU) Second Office Action—App 2006230171.
Oct. 18, 2011—(EP) Communication Pursuant to Article 94(3)—App 06 758 213.0.
Aug. 7, 2012—U.S. Non Final Rejection—U.S. Appl. No. 12/871,806.
Feb. 6, 2012—U.S. Final Rejection—U.S. Appl. No. 12/871,806.
Jun. 9, 2012—(AU) Notice of Acceptance—App 2006230171.
Jun. 26, 2012—(EP) Extended Search Report—App 05857614.1.
Nov. 2, 2012—(EP) Communication under rule 71(3)—App 06 758 213.0.
Nov. 26, 2012—U.S. Final Rejection—U.S. Appl. No. 12/871,806.
Apr. 4, 2013—U.S. Notice of Allowance—U.S. Appl. No. 12/871,806.
Apr. 18, 2013—(EP) Decision to Grant a European Patent—App 06758212.0.
Jan. 16, 2013—(CA) Office Action—App 2,594,020.
Jan. 17, 2013—(CA) Office Action—App 2,600,236.
Nov. 7, 2013 (WO) International Search Report—App. PCT/US2013/057502.
Jun. 24, 2014 (WO) International Search Report—App. PCT/US2014/023286.
Jun. 26, 2014 (WO) International Search Report—App. PCT/US2014/027723.
Mar. 24, 2014 (WO) International Search Report—App. PCT/US2013/072566.
May 26, 2014—(CA) Office Action—App 2010297968.
Apr. 28, 2015 (WO) International Preliminary Report on Patentability—App. PCT/US2013/057502, dated Apr. 28, 2015.
Dec. 22, 2015—U.S. Final Office Action—U.S. Appl. No. 14/714,207.
Jan. 14, 2015—(EP) Extended Search Report—App 10819667.6.
Jul. 10, 2015—(WO) Communication Relating to the Results of the Partial International Search for International App—PCT/US2015/024691.
Jul. 14, 2015—(WO) International Preliminary Report on Patentability—App PCT/US2013/072566.
May 14, 2015—U.S. Non Final Rejection—U.S. Appl. No. 13/940,240.
May 25, 2015—(AU) Notice of Acceptance—App 2010297968.
Nov. 2, 2015—(AU) Office Action—App 2013372879.
Nov. 27, 2015—U.S. Final Rejection—U.S. Appl. No. 13/940,240.
Sep. 15, 2015 (WO) International Preliminary Report on Patentability—App.—PCT/US2014/027723.
Sep. 15, 2015 (WO) International Preliminary Report on Patentability—App. PCT/US2014/023286.
Sep. 16, 2015 (WO) International Search Report and Written Opinion—App. No. PCT/US2015/024691.
Sep. 4, 2015—U.S. Notice of Allowance—U.S. Appl. No. 14/702,755.
Opening Brief for Appellant Centripetal Networks, LLC, CAFC Appeal No. 23-1731 (IPR2021-1158, U.S. Pat. No. 10,503,899) (Aug. 21, 2023).
Brief of Appellee, CAFC Appeal No. 23-1731 (IPR2021-1158, U.S. Pat. No. 10,503,899) (Nov. 1, 2023).
Reply Brief for Appellant Centripetal Networks, LLC, CAFC Appeal No. 23-1731 (IPR2021, U.S. Pat. No. 10,503,899) (Dec. 22, 2023).
Exhibit 1031 in IPR2021-01158—Google Scholar, Kent, et al., Building a dynamic reputation system for dns, <<https://scholar.google.com/scholar?hl=2n&as_sdt=5%2C33&sciodt=0%2C33&cites=3828877670814134967&scipsc=&as_ylo=&as_yhi=2016>>, date of publication unknown but, prior to Jul. 17, 2021, 3 pages.

(56) References Cited

OTHER PUBLICATIONS

Exhibit 1032 in IPR2021-01158—Google Scholar, Gu, et al., BotHunter: Detecting Malware Infection Through IDS-Driven Dialog Correlation, date of publication unknown but, prior to Jul. 27, 2021, 2 pages.
Exhibit 1033 in IPR2021-01158—Google Scholar, Kent, et al., Guide to Computer Security Log Management, 2006, 3 pages.
Exhibit 1034 in IPR2021-01158—Google Scholar, Ning, et al., Constructing attack scenarios through correlation of intrusion alerts, date of publication unknown but, prior to Jul. 27, 2021, 3 pages.
Exhibit 1040 in IPR2021-01158—Jul. 24, 2021, email re PAN schedule, 9 pages.
Exhibit 1041 in IPR2021-01148—Services (Services), 2014 IEEE World Congress . . . , IEEE Xplore Digital Library, Jun. 27, 2014-Jul. 2, 2014, 5 pages.
Exhibit 1042 in IPR2021-01158—Porras, et al., "A Mission-Impact-Based Approach to INFOSEC Alarm Correlation," date of publication unknown but, prior to Jul. 27, 2021, 1 page.
Exhibit 1043 in IPR2021-01158—Declaration of Jonathan Bradford in Support of Petition for Inter Partes Review of U.S. Pat. No. 10,503,899, executed Jul. 21, 2021, 17 pages.
Exhibit 1044 in IPR2021-01158—Jul. 21, 2021, email re: Activity in Case 2:21-cv-00137-RCY-RJKVAED, Pretrial Conference—Initial, 2 pages.
Petition for Inter Partes Review—IPR2021-01158, U.S. Pat. No. 10,503,899, executed Jul. 22, 2021, 80 pages.
Petitioner's Power of Attorney Under 37 CFR § 42.10(b), IPR2021-01158, U.S. Pat. No. 10,503,899, executed Jul. 13, 2021, 3 pages.
Sep. 1, 2021 (CN)—Second Office Action—App 201880056482.9.
Dec. 17, 2021—Patent Owner's Preliminary Response, Case IPR2021-01158, U.S. Pat. No. 10,503,899, *Palo Alto Networks, Inc.* v. *Centripetal Networks, Inc.*, 56 pages.
Mar. 31, 2022—(AU) Examination Report No. 1—App 2018301781.
Apr. 6, 2022—(CN) Third Office Action—App 2018800564829.
Mar. 15, 2022—IPR2021-01158, U.S. Pat. No. 10,503,899 B2, Decision Granting Institution of Inter Partes Review 35 U.S.C. § 314, 36 pages.
Jun. 13, 2022—Patent Owner's Response, Case IPR2021-01158, U.S. Pat. No. 10,503,899, *Palo Alto Networks, Inc.* v. *Centripetal Networks, Inc.*, 72 pages.
Exhibit 2011 in IPR2021-01158—Declaration of Dr. Alessandro Orso in Support of Patent Owner's Response, Jun. 13, 2022, 121 pages.
Exhibit 2012 in IPR2021-01158—Transcript of the deposition of Dr. Wenke Lee, *Palo Alto Networks, Inc.* v. *Centripetal Networks, Inc.*, taken on Jun. 2, 2022, 32 pages.
Information Security Technology, Second Edition (ISBN: ISBN: 978-7-5647-2977-6, Press: University of Electronic Science and Technology Press, publication date: May 31, 2015, Series Title: Information Security Personnel Certification Training Materials) Section 20. 5 Implementation Technology of IDS, pp. 538-543.
Oct. 10, 2022 (CN) Decision of Rejection—App 2018800564829.
Sep. 21, 2022 (AU) Notice of Acceptance—App. No. 2018301781.
Exhibit 1056 in IPR2021-01158—Merriam Webster Dictionary definition of "likelihood" archived Aug. 17, 2017 https://web.archive.org/web/20170817231819/https://www.merriamwebster.com/dictionary/likelihood >.
Oct. 17, 2022—Patent Owner's Sur-Reply, Case IPR2021-01158, U.S. Pat. No. 10,503,899, *Palo Alto Networks, Inc.* v. *Centripetal Networks, Inc.*, 33 pages.
Sep. 6, 2022—Petitioner's Reply to Patent Owner's Response, Case IPR2021-01158, U.S. Pat. No. 10,503,899, *Palo Alto Networks, Inc.* v. *Centripetal Networks, Inc.*, 39 pages.
Nov. 4, 2022—U.S. Final Office Action—U.S. Appl. No. 16/584,084.
Dec. 14, 2022—U.S. Notice of Allowance—U.S. Appl. No. 16/584,084.
Feb. 7, 2023—(EP)—Extended European Search Report—App. No. 22205837.2.
Mar. 13, 2023—Final Written Decision, Case IPR2021-01158, U.S. Pat. No. 10,503,899, *Palo Alto Networks, Inc.* v. *Centripetal Networks, LLC*, 43 pages.

G. Brightwell et al., "Counting Linear Extensions is #P-Complete", Proceedings of the Twenty-Third Annual ACM Symposium on Theory of Computing, 1991.
G.V. Rooij, "Real Stateful TCP Packet Filtering in IP Filter", Proceedings of the 10th USENIX Security Symposium, 2001.
Greenwald, Michael; "Designing an Academic Firewall: Policy, Practice, and Experience with SURF"; IEEE, Proceedings of SNDSS, 1996.
J. Xu et al., "Design and Evaluation of a High-Performance ATM Firewall Switch and Its Applications", IEEE Journal on Selected Areas in Communications, 17(6): 1190-1200, Jun. 1999.
J.K. Lenstra et al., "Complexity of Scheduling Under Precedence Constraints", Operations Research, 26(1): 22-35, 1978.
Kindervag, et al. "Build Security Into Your Network's DNA: The Zero Trust Network Architecture," Forrester Research Inc.; Nov. 5, 2010, pp. 1-26.
L. Qui et al., "Fast Firewall Implementations for Software and Hardware-Based Routers", Proceedings of ACM Sigmetrics, Jun. 2001.
Lee et al., "Development Framework for Firewall Processors," IEEE, pp. 352-355 (2002).
M. Al-Suwaiyel et al., "Algorithms for Trie Compaction", ACM Transactions on Database Systems, 9(2): 243-263, Jun. 1984.
M. Christiansen et al., "Using IDDs for Packet Filtering," Technical Report, BRICS, Oct. 2002.
M. Degermark et al., "Small Forwarding Tables for Fast Routing Lookups", Proceedings of ACM SIGCOMM, 4-13, 1997.
Mizuno et al., A New Remote Configurable Firewall System for Home-use Gateways, Jan. 2005. Second IEEE Consumer Communications and Networking Conference, pp. 599-601.
Moore, S, "SBIR Case Study: Centripetal Networks: How CNI Leveraged DHS S&T SBIR Funding to Launch a Successful Cyber Security Company," 2012 Principal Investigators' Meeting, Cyber Security Division, Oct. 10, 2014.
Nichols, et al., "Definition of the Differentiated Services Field (DS Field) in the IPV4 and IPV6 Headers," Network Working Group RFC 2474, Dec. 1998, 20 pages.
O. Paul et al., "A full Bandwidth ATM Firewall", Proceedings of the 6th European Symposium on Research in Computer Security ESORICS'2000, 2000.
P. Warkhede et al., "Fast Packet Classification for Two-Dimensional Conflict-Free Filters", Proceedings of IEEE INFOCOM, 1434-1443, 2001.
Palo Alto Networks; "Designing A Zero Trust Network With Next-Generation Firewalls"; pp. 1-10; last viewed on Oct. 21, 2012.
Perkins, "IP Encapsulation with IP," Network Working Group RFC 2003, Oct. 1996, 14 pages.
R. Funke et al., "Performance Evaluation of Firewalls in Gigabit-Networks", Proceedings of the Symposium on Performance Evaluation of Computer and Telecommunication Systems, 1999.
R. Rivest, "On Self-Organizing Sequential Search Heuristics", Communications of the ACM, 19(2): 1976.
R.L. Graham et al., "Optimization and Approximation in Deterministic Sequencing and Scheduling: A Survey", Annals of Discrete Mathematics, 5: 287-326, 1979.
Reddy, A.L.(2012) A.L. Narasimha Reddy Curriculum Vitae. Retrieved from https://cesg.tamu.edu/wp-content/uploads/2012/02/res_ext032.pdf, 16 pages.
Reumann, John; "Adaptive Packet Filters"; IEEE, 2001, Department of Electrical Engineering and Computer Science, the University of Michigan, Ann Arbor, MI.
S,M. Bellovin et al., "Network Firewalls", IEEE Communications Magazine, 50-57, 1994.
S. Goddard et al., "An Unavailability Analysis of Firewall Sandwich Configurations", Proceedings of the 6th IEEE Symposium on High Assurance Systems Engineering, 2001.
S. Suri et al., "Packet Filtering in High Speed Networks", Proceedings of the Symposium on Discrete Algorithms, 969-970, 1999.
Singh, Rajeev et al. "Detecting and Reducing the Denial of Service attacks in WLANs", Dec. 2011, World Congress on Information and Communication TEchnologies, pp. 968-973.
Sourcefire 3D System User Guide, Version 4.10, Mar. 16, 2011, 2123 pages.

(56) References Cited

OTHER PUBLICATIONS

Statement RE: Related Application, dated Jul. 24, 2015.
Tarsa et al., "Balancing Trie-Based Policy representations for Network Firewalls," Department of Computer Science, Wake Forest University, pp. 1-6 (2006).
U. Ellermann et al., "Firewalls for ATM Networks", Proceedings of INFOSEC'COM, 1998.
V. Srinivasan et al., "Fast and Scalable Layer Four Switching", Proceedings of ACM SIGCOMM, 191-202, 1998.
V.P. Ranganath, "A Set-Based Approach to Packet Classification", Proceedings of the IASTED International Conference on Parallel and Distributed Computing and Systems, 889-894, 2003.
W.E. Leland et al., "On the Self-Similar Nature of Ethernet Traffic", IEEE Transactions on Networking, 2(1); 15, 1994.
W.E. Smith, "Various Optimizers for Single-Stage Productions", Naval Research Logistics Quarterly, 3: 59-66, 1956.
X. Gan et al., "LSMAC vs. LSNAT: Scalable Cluster-based Web servers", Journal of Networks, Software Tools, and Applications, 3(3): 175-185, 2000.
Ylonen, et al, "The Secure Shell (SSH) Transport Layer Protocol," SSH Communication Security Corp, Newtork Working Group RFC 4253, Jan. 2006, 32 pages.
Feb. 21, 2019—U.S. Final Office Action—U.S. Appl. No. 15/382,806.
Jan. 24, 2019 U.S. Decision—Institution of Inter Partes Review of U.S. Pat. No. 9,160,713 B2—IPR 2018-01437.
Mar. 8, 2019 U.S. Notice of Allowance and Fees Due—U.S. Appl. No. 16/030,374.
Aug. 21, 2018 (US) Petition for Inter Partes Review of U.S. Pat. No. 9,686,193—IPR2018-01559.
Aug. 15, 2018 (US) Declaration of Staurt Staniford, PhD in Support of Petition for Inter Partes Review of U.S. Pat. No. 9,686,193—IPR2018-01556.
Jan. 24, 2019 U.S. Decision—Institution of Inter Partes Review of U.S. Pat. No. 9,124,552 B2—IPR 2018-01436.
Mar. 18, 2019 (AU) First Examination Report—App. 2016379156.
Apr. 8, 2019 U.S. Final Office Action—U.S. Appl. No. 15/413,947.
Aug. 10, 2018 (US) Declaration of Kevin Jeffay, PhD in Support of Fourth Petition for Inter Partes Review of U.S. Pat. No. 9,137,205—IPR2018-01506.
Aug. 10, 2018 (US) Fourth Petition for Inter Partes Review of U.S. Pat. No. 9,137,205—IPR2018-01506.
Aug. 3, 2018 (US) Third Petition for Inter Partes Review of U.S. Pat. No. 9,137,205—IPR2018-01505.
Aug. 3, 2018 (US) Declaration of Kevin Jeffay, PhD in Support of Third Petition for Inter Partes Review of U.S. Pat. No. 9,137,205—IPR2018-01505.
Aug. 3, 2018 (US) Declaration of Kevin Jeffay, PhD in Support of Third Petition for Inter Partes Review of U.S. Pat. No. 9,560,077—IPR2018-01513.
Apr. 2, 2019 U.S. Decision—Institution of Inter Partes Review of U.S. Pat. No. 9,560,077—IPR 2018-01513.
Aug. 1, 2018 (US) Petition for Inter Partes Review of Claims 1-20 of U.S. Pat. No. 9,560,077—IPR2018-01513.
Jun. 3, 2019 U.S. Final Office Action—U.S. Appl. No. 15/614,956.
May 23, 2019 U.S. Non-Final Office Action—U.S. Appl. No. 14/745,207.
May 24, 2019 U.S. Non-Final Office Action—U.S. Appl. No. 16/111,524.
Jun. 3, 2019 (EP) Communication pursuant to Article 94(3) EPC—Third Examination Report—App. 13765547.8.
Aug. 2, 2018 U.S. Notice of Allowance and Fees Due—U.S. Appl. No. 16/030,254.
Jul. 5, 2019 (EP) Extended European Search Report—App. 19179539.2.
Aug. 2, 2019 (CA) Office Action—App. 2,888,935.
Aug. 2, 2019 U.S. Non-Final Office Action—U.S. Appl. No. 16/448,969.
Aug. 16, 2019 (EP) Extended Search Report—App. 19170936.9.
Sep. 18, 2018 (US) Petition for Inter Partes Review of U.S. Pat. No. 9,413,722—IPR 2018-01760.
Sep. 18, 2018 (US) Declaration of Dr. Stuart Staniford in Support of Petition for Inter Partes Review of U.S. Pat. No. 9,413,722—IPR 2018-01760.
Sep. 3, 2019 U.S. Notice of Allowance and Fees Due—U.S. Appl. No. 16/518,190
Aug. 19, 2019 (EP) Communication pursuant to Article 94(3) EPC—Examination Report—App. 14719415.3.
Oct. 11, 2019—U.S. Non-Final Office Action—U.S. Appl. No. 16/554,293.
Oct. 10, 2019—U.S. Notice of Allowance—U.S. Appl. No. 16/448,997.
Sep. 30, 2019 (WO) International Search Report and Written Opinion of International Searching Authority—Application No. PCT/US2019/040830.
Exhibit 1022—"Transmission Control Protocol," IETF RFC 793. J. Postel, ed., Sep. 1981.
Exhibit 1023—"Internet Protocol," IETF RFC 791, J. Postel, ed., Sep. 1981.
Exhibit 1024—"File Transfer Protocol," IETF RFC 765, J. Postel, ed., Jun. 1980.
May 20, 2019 U.S. Decision—Institution of Inter Partes Review of U.S. Pat. No. 9,413,722 B1—IPR 2018-01760.
Aug. 20, 2019 (US) Declaration of Dr. Alessandro Orso in Support of Patent Owner's Response of U.S. Pat. No. 9,413,722—IPR 2018-01760.
Feb. 21, 2019 (US) Patent Owner's Preliminary Response of U.S. Pat. No. 9,413,722—IPR 2018-01760.
Aug. 20, 2019 (US) Patent Owner's Response of U.S. Pat. No. 9,413,722—IPR 2018-01760.
Jan. 15, 2020 (US) Patent Owner's Sur-Reply to Petitioner's Reply—IPR 2018-01760.
Jan. 8, 2020 (US) Deposition of Jacob H. Baugher, III—IPR 2018-01760.
Jan. 20, 2021—(CN) First Office Action—App 201880056482.9.
Mar. 25, 2021—(EP) Communication—App 18747074.5.
Exhibit 1002 in IPR2021-01158—Part 1 of File History of U.S. Pat. No. 10,503,899, issued Dec. 10, 2019.
Exhibit 1002 in IPR2021-01158—Part 2 of File History of U.S. Pat. No. 10,503,899, issued Dec. 10, 2019.
Exhibit 1002 in IPR2021-01158—Part 3 of File History of U.S. Pat. No. 10,503,899, issued Dec. 10, 2019.
Exhibit 1003 of IPR2021-01158—Claim Appendix of U.S. Pat. No. 10,503,899 for IPR2021-01158, date of publication unknown but, prior to Jul. 27, 2021, 4 pages.
Exhibit 1004 in IPR2021-01158—Declaration of Dr. Wenke Lee in Support of Petition for Inter Partes Review of U.S. Pat. No. 10,503,899, executed Jul. 21, 2021, 168 pages.
Exhibit 1008 in IPR2021-01158—Amended Complaint for Patent Infringement, Case 2:21-cv-00137-RCY-RJK, Document 65, filed Jul. 9, 2021, 167 pages.
Exhibit 1009 in IPR2021-01158—Jul. 8, 2021, Trial Date Email, 2 pages.
Exhibit 1012 in IPR2021-01158—Kent, "Guide to Computer Security Log Management, Recommendations of the National Institute of Standards and Technology," NST Special Publication 800-92, Sep. 2006, 72 pages.
Exhibiti 1016 in IPR2021-01158—Antonakakis, et al., "Buidling a Dynamic Reputation System for DNS," date of publication unknown but, prior to Jul. 27, 2021, 17 pages.
Exhibit 1017 in IPR2021-01158—Fellin, et al., "Preventing Mistraining of Anomaly-Based IDSs through Ensemble Systems," 2014 IEEE 10th World Congress on Services, pp. 66-68.
Exhibit 1018 in IPR2021-01158—Gu, et al., "BotHunter: Detecting Malware Infection Through IDS-Driven Dialog Correlation," 16th USENIX Security Symposium, date of publication unknown but, prior to Jul. 27, 2021, pp. 167-182.
Exhibit 1019 in IPR2021-01158—Porras, et al., "A Mission-Impact-Based Approach to INFOSEC Alarm Correlation," date of publication unknown but, prior to Jul. 27, 2021, 19 pages.
Exhibit 1022 of IPR2021-01158—Building a Dynamic Reputation System for DNS, 19th USENIX Security Symposium, Aug. 11-13, 2010, <<https://www.usenix.org/conference/usenixsecurity10/building-dynamic-reputation-system-dns>>, 2 pages.

(56) References Cited

OTHER PUBLICATIONS

Exhibit 1023 in IPR2021-01158—Antonakakis, et al., "Building a Dynamic Reputation System for DNS," date of publication unknown but, prior to Jul. 27, 2021, 18 pages.
Exhibit 1024 in IPR2021-01158—Fellin, et al., "Preventing the Mistraining of Anomaly-Based IDSs through Ensemble Systems," 2014 IEEE Conference Publication, IEEE Xplore, 2014, date of publication unknown but, prior to Jul. 17, 2021, <<https://ieeexplore.ieee.org/documents/6903245>>, 3 pages.
Exhibit 1025 in IPR2021-01158—Fellin, Preventing the Mistraining of Anomaly-Based IDSs through Ensemble Systems, 2014 IEEE World Congress on . . . , IEEE Conference Publication, IEEE Xplore, date of publication unknown but, prior to Jul. 17, 2021, 1 page.
Exhibit 1026 in IPR2021-01158—Gu, et al., "BotHunter: Detecting Malware Infection Through IDS-Driven Dialog Correlation," date of publication unknown but, prior to Jul. 27, 2021, 17 pages.
Exhibit 1027 in IPR2021-01158—Kent, "Guide to Computer Security Log Management, Recommendations of the National Institute of Standards and Technology," Sep. 2006, 73 pages.
Exhibit 1028 in IPR2021-01158—CS 8803: Advanced System and Network Security, Spring 2003, <<file:///C:/Users/bmclaughlin/AppData/Local/Microsoft/Windows/INetCache/Content.Outlook/0CYN2FPV/index.html>>, 3 pages.
Exhibit 1029 in IPR2021-01158—Readings in Intrusion Detection, <<wenke.gtisc.gatech.edu/ids-readings.html>>, date of publication unknown but, prior to Jul. 17, 2021, 4 pages.
Exhibit 1030 in IPR2021-01158—Readings in Intrusion Detection, date of publication unknown but, prior to Jul. 27, 2021, 1 page.
Jul. 20, 2018 (US) Petition for Inter Partes Review of U.S. Pat. No. 9,160,713—IPR2018-01437.
Jul. 26, 2018 (US) Declaration of Kevin Jeffay, PhD in Support of First Petition for Inter Partes Review of U.S. Pat. No. 9,137,205—IPR2018-01443.
Jul. 26, 2018 (US) Declaration of Kevin Jeffay, PhD in Support of Second Petition for Inter Partes Review of U.S. Pat. No. 9,137,205—IPR2018-01444.
Jul. 27, 2018 (US) First Petition for Inter Partes Review of U.S. Pat. No. 9,137,205—IPR2018-01443.
Jul. 27, 2018 U.S. Non-Final Office Action—U.S. Appl. No. 15/382,806.
Jul. 27, 2018 (US) Second Petition for Inter Partes Review of U.S. Pat. No. 9,137,205—IPR2018-01444.
Jul. 5, 2018 U.S. Non-Final Office Action—U.S. Appl. No. 15/413,750.
Mar. 15, 2018 (EP) Second Communication pursuant to Article 94(3) EPC—App. 13765547.8.
Mar. 16, 2018 (EP) Communication Pursuant to Rule 164(2)(b) and Article 94(3) EPC—App. 15722292.8.
Mar. 21, 2018 (AU) First Examination Report—App. 2015382393.
Mar. 8, 2018 U.S. Non-Final Office Action—U.S. Appl. No. 14/745,207.
May 25, 2018 U.S. Notice of Allowance—U.S. Appl. No. 15/413,834.
Nov. 14, 2018 U.S. Final Office Action—U.S. Appl. No. 14/745,207.
Oct. 12, 2018 U.S. Non-Final Office Action—U.S. Appl. No. 16/039,896
Oct. 4, 2018 U.S. Non-Final Office Action—U.S. Appl. No. 16/030,374.
Oct. 4, 2018 U.S. Notice of Allowance—U.S. Appl. No. 15/827,477.
Sep. 17, 2018 (US) Declaration of Narasimha Reddy Ph.D., in Support of Petition for Inter Partes Review of U.S. Pat. No. 9,560,176 (First)—IRP2018-01654.
Sep. 17, 2018 (US) Declaration of Narasimha Reddy Ph.D., in Support of Petition for Inter Partes Review of U.S. Pat.No. 9,560,176 (Second)—IRP2018-01655.
Sep. 17, 2018 (US) Petition for Inter Partes Review of U.S. Pat. No. 9,560,176 (First)—IPR 2018-01654.
Sep. 17, 2018 (US) Petition for Inter Partes review of U.S. Pat. No. 9,560,176 (Second)—IPR2018-01655.
Sep. 27, 2018 (WO) International Search Report and Written Opinion—App. PCT/US2018/043367.
Sep. 4, 2018 (WO) International Search Report and Written Opinion—App. PCT/US2018/041355.
Sep. 27, 2018 U.S. Non-Final Office Action—U.S. Appl. No. 15/614,956.
Feb. 6, 2019 U.S. Final Office Action—U.S. Appl. No. 15/413,750.
Feb. 6, 2019 U.S. Notice of Allowance and Fees Due—U.S. Appl. No. 16/039,896.
Jan. 24, 2019 U.S. Notice of Allowance—U.S. Appl. No. 15/610,995.
Mar. 11, 2019 U.S. Final Office Action—U.S. Appl. No. 16/030,354.
Mar. 8, 2019 U.S. Notice of Allowance and Fees Due—U.S. Appl. No. 16/060,374.
A. Feldmann et al., "Tradeoffs for Packet Classification", Proceedings of the IEEE INFOCOM, 397-413, 2000.
A. Hari et al., "Detecting and Resolving Packet Filter Conflicts", Proceedings of IEEE INFOCOM, 1203-1212, 2000.
Acharya et al, "OPTWALL: A Hierarchical Traffic-Aware Firewall," Department of Computer Science, Telecommunications Program, University of Pittsburgh, pp. 1-11 (2007).
Anonymous: "The Distribution of Malicious Domains," The DomainTools Report, 2016 Edition, Mar. 9, 2016 (Mar. 9, 2016), pp. 1-11, XP055502306, Retrieved from: https://www.domaintools.com/resources/white-papers/the-domaintools-report-the-distribution-of-malicious-domains.
Bellion, "High Performance Packet Classification", http://www.hipac.org (Publication Date Unknown).
Blake, et al., "An Architecture for Differentiated Services," Network Working Group RFC 2475, Dec. 1998, 36 pages.
Blake, et al., "An Architecture for Differentiated Services," also known as the Diffserv architecture, as defined in RFC 2475, Network Working Group, Dec. 1998, 36 pages.
C. Benecke, "A Parallel Packet Screen for High Speed Networks", Proceedings of the 15th Annual Computer Security Applications Conference, 1999.
Chen, et al, "Research on the Anomaly Discovering Algorithm of the Packet Filtering Rule Sets," Sep. 2010, First International Confererence on Pervasive Computing, Signal Processing and Applications, pp. 362-366.
D. Comer, "Analysis of a Heuristic for Full Trie Minimization", ACM Transactions on Database Systems, 6(3): 513-537, Sep. 1981.
D. Decasper et al., "Router Plugins: A Software Architecture for Next-Generation Routers", IEEE/ACM Transactions on Networking, 8(1): Feb. 2000.
D. Eppstein et al., "Internet Packet Filter Management and Rectangle Geometry", Proceedings of the Symposium on Discrete Algorithms, 827-835, 2001.
E. Al-Shaer et al., "Firewall Policy Advisor for Anomaly Discovery and Rule Editing", Proceedings of the IFIP/IEEE International Symposium on Integrated Network Management, 2003.
E. Al-Shaer et al., "Modeling and Management of Firewall Policies", IEEE Transactions on Network and Service Management, 1(1): 2004.
E. Fulp et al., "Network Firewall Policy Tries", Technical Report, Computer Science Department, Wake Forest University, 2004.
E. Fulp, "Optimization of Network Firewall Policies Using Ordered Sets and Directed Acyclical Graphs", Technical Report, Computer Scient Department, Wake Forest University, Jan. 2004.
E. Fulp, "Preventing Denial of Service Attacks on Quality of Service", Proceedings of the 2001 DARPA Information Survivability Conference and Exposition II, 2001.
E.L. Lawler, "Sequencing Jobs to Minimize Total Weighted Completion Time Subject to Precedence Constraints", Annals of Discrete Mathematics, 2: 75-90, 1978.
E.W. Fulp, "Firewall Architectures for High Speed Networks", U.S. Department of Energy Grant Application, Funded Sep. 2003.
Frahim, et al., "Cisco ASA: All-in-One Firewall, IPS, and VPN Adaptive Security Appliance," Indiana: Cisco Press: 2006, 54 pages.
Fulp, "Trie-Based Policy Representations for Network Firewalls," Proceedings of the IEEE International Symposium on Computer Communications (2005).
Fulp, Errin: "CV: Errin Fulp," XP002618346, www.cs.wfu.edu/fulp/ewfPub.html, pp. 1-5 (Copyright 2010).
Apr. 15, 2016—U.S. Notice of Allowance—U.S. Appl. No. 14/855,374.
Apr. 26, 2016—U.S. Office Action—U.S. Appl. No. 14/745,207.
Dec. 5, 2016—U.S. Notice of Allowance—U.S. Appl. No. 14/714,207.

(56) References Cited

OTHER PUBLICATIONS

Feb. 24, 2016—(AU) Office Action—App 2014228257.
Feb. 25, 2016—(AU) Office Action—App 2014249055.
Feb. 26, 2016—U.S. Non Final Office Action—U.S. Appl. No. 14/253,992.
Jan. 11, 2016—U.S. Non Final Rejection—U.S. Appl. No. 14/698,560.
Jan. 28, 2016—(WO) International Search Report and Written Opinion—App PCT/US2015/062691.
Jul. 11, 2016—(EP) Office Action—App 14720824.3.
Jul. 20, 2016—(AU) Office Action—App 2013335255.
Jul. 22, 2016—U.S. Office Action—U.S. Appl. No. 14/921,718.
Jun. 9, 2016—(WO) International Search Report—PCT/US2016/026339.
Jun. 14, 2016—U.S. Office Action—U.S. Appl. No. 14/625,486.
Jun. 16, 2016—(CA) Office Action—App 2,888,935.
May 6, 2016—U.S. Office Action—U.S. Appl. No. 14/714,207.
May 13, 2016—U.S. Office Action—U.S. Appl. No. 13/940,240.
Nov. 21, 2016—U.S. Office Action—U.S. Appl. No. 14/745,207.
Oct. 5, 2016—U.S. Notice of Allowance—U.S. Appl. No. 14/698,560.
Oct. 26, 2016—U.S. Office Action—U.S. Appl. No. 13/940,240.
Sep. 13, 2016—(CA) Office Action—App 2,902,206.
Sep. 14, 2016—(CA) Office Action—App 2,897,737.
Sep. 26, 2016—(CA) Office Action—App 2,902,158.
Apr. 12, 2017—U.S. Office Action—U.S. Appl. No. 14/757,638.
Aug. 15, 2017 (WO) International Preliminary Report on Patentability—App. PCT/US2015/062691.
Aug. 21, 2017 (AU) First Examination Report—App. 2015248067.
Feb. 10, 2017—U.S. Notice of Allowance—U.S. Appl. No. 14/625,486.
Feb. 15, 2017—U.S. Notice of Allowance—U.S. Appl. No. 14/921,718.
Jul. 20, 2017 (US) Complaint for Patent Infringement—Case No. 2:17-cv-00383-HCN-LRL, Document 1, 38 pages.
Jun. 7, 2017—U.S. Office Action—U.S. Appl. No. 14/745,207.
Jun. 7, 2017—(WO) International Search Report and Written Opinion—App PCT/US2016/067111.
Mar. 6, 2017—(WO) International Search Report and Written Opinion—App PCT/US2016/068008.
Nov. 21, 2017 U.S. Notice of Allowance—U.S. Appl. No. 14/690,302.
Nov. 3, 2017 U.S. Non-Final Office Action—U.S. Appl. No. 15/413,834.
Oct. 17, 2017 (WO) International Preliminary Report on Patentability—App. PCT/US2016/026339.
Sep. 5, 2017 (US) Defendant Ixia's Partial Answer to Complaint for Patent Infringement—Case No. 2:17-cv-00383-HCN-LRL, Document 29, 14 pages.
Sep. 5, 2017 (US) Memorandum in Support of Defendant's Ixia and Keysight Technologies, Inc's Motion to Dismiss for Unpatentability Under 35 U.S.C. § 101—Case No. 2:17-cv-00383-HCM-LRL, Document 21, 29 pages.
Sep. 5, 2017 (US) Request for Judicial Notice in Support of Defendants Ixia and Keysight Technologies, Inc's Motion to Dismiss for Unpatentability under 35 U.S.C. § 101—Case No. 2:17-cv-00383-HCN-LRL, Document 22, 3 pages.
Sep. 29, 2017 (CA) Examination Report—App. 2,772,630.
Apr. 17, 2018 U.S. Non-Final Office Action—U.S. Appl. No. 15/610,995.
Aug. 15, 2018 U.S. Declaration of Kevin Jeffay, PhD in Support of Petition for Inter Partes Review of U.S. Pat. No. 9,565,213—IPR2018-01512.
Aug. 20, 2018 U.S. Petition for Inter Partes Review of U.S. Pat. No. 9,565,213—IPR2018-01512.
Aug. 29, 2018 (CA) Office Action—App. 2,888,935.
Aug. 9, 2018 U.S. Non-Final Office Action—U.S. Appl. No. 15/413,947.
Dec. 18, 2018 U.S. Final Office Action—U.S. Appl. No. 15/610,995.
Jul. 11, 2018 U.S. Declaration of Kevin Jeffay, PhD in Support of Petition for Inter Partes Review of U.S. Pat. No. 9,565,213—IPR2018-01386.
Jul. 12, 2018 (US) Petition for Inter Partes Review of U.S. Pat. No. 9,565,213—IPR2018-01386.
Jul. 13, 2018 U.S. Notice of Allowance—U.S. Appl. No. 15/414,117.
Jul. 20, 2018 (US) Declaration of Dr. Stuart Staniford in Support of Petition for Inter Partes Review of U.S. Pat. No. 9,124,552—IPR2018-01436.
Jul. 20, 2018 (US) Declaration of Dr. Stuart Staniford in Support of Petition for Inter Partes Review of U.S. Pat. No. 9,160,713—IPR2018-01437.
Jul. 20, 2018 (US) Petition for Inter Partes Review of U.S. Pat. No. 9,124,552—IPR2018-01436.

\* cited by examiner

* Illustrative functional diagram of a Cyber Threat Intelligence (CTI) operational system Illustrative functional environment for a cyberanalysis workflow application process

FIG. 4

| Reportability Likelihood | Indicator Type | Indicator Age (days) | CTI Score (normalized) |
|---|---|---|---|
| 0.8 | URL | Don't Care | Don't Care |
| 0.7 | FQDN | [0, 30) | High |
| 0.6 | FQDN | [30, 60) | Medium |
| 0.5 | FQDN | [60, 180) | Low |
| 0.4 | IP | [0, 30) | High |
| 0.3 | IP | [30, 60) | Medium |
| 0.2 | IP | [60, 180) | Low |
| 0.1 | IP or FQDN | [180, inf) | Don't Care |

Illustrative human-designed (H/D) heuristic algorithm for estimating reportability likelihood in a cyberanalysis workflow application process Illustrative machine learning system for creating M/L algorithms that estimate reportability likelihoods of threat events

FIG. 6a

| Feature/ Characteristic Name | Numeric Value Type | Description |
|---|---|---|
| CTI-Prvdr-1 | Boolean | 1 if this CTI Provider has the matching indicator/signature/pattern in its CTI database, 0 otherwise |
| CTI-Prvdr-2 | Boolean | " |
| ... | ... | " |
| CTI-Prvdr-N | Boolean | " |
| Norm-PolyGram-Entropy-LL-e2LD | [0,1] | Normalized polygram entropy of the leading label of the effective 2nd-level domain |
| Norm-PolyGram-Entropy-LL-e3LD | [0,1] | Normalized polygram entropy of the leading label of the effective 3rd-level domain (if present) |
| Numeric-Head-LL-e2or3LD | Boolean | 1 if the leading label of the effective 2nd-level and/or 3rd-level domain has a numeric head, i.e., begins with numeric characters; 0 otherwise |
| String-Length-LL-e{2,3}LD-Bin-X-Y | Boolean | 1 if the string length of the leading label of the effective 2nd-level and/or 3rd-level domain is in the bin range [X,Y]; 0 otherwise. Note: There will be multiple features of this type, each with a different, non-overlapping bin range. |
| TLD-Category-{g, s, cc, other} | Boolean | 1 if the top-level-domain is in the major category type; 0 otherwise. Note: There may be four (4) features of this type, for the four categories gTLD, sTLD, ccTLD, other. |

Feature vector characteristics for estimating reportability likelihood in cyberanalysis workflow acceleration

FIG. 6b

| Feature/ Characteristic Name | Numeric Value Type | Description |
|---|---|---|
| Time-of-Day-Bin-X-Y | Boolean | 1 if the Time-of-Day is in the bin range [X,Y]; 0 otherwise. Note: There will be multiple features of this type, each with a different, non-overlapping bin range. |
| Weekend-or-Holiday | Boolean | 1 if the event occurs during a weekend or holiday; 0 otherwise. |
| Flow-Byte-Count-Bin-X-Y | Boolean | 1 if the event's flow byte count is in the bin range [X,Y]; 0 otherwise. Note: There will be multiple features of this type, each with a different, non-overlapping bin range. |
| Percentage-Digits-FQDN | [0,1] | Percentage of digits (numeric characters) in the event's FQDN |
| Percentage-Hyphens-FQDN | [0,1] | Percentage of hyphen characters in the event's FQDN |
| Percentage-NonCompliant-Characters-FQDN | [0,1] | Percentage of characters in the event's FQDN that are non-compliant with RFC 1035 |
| Direction-and-Breach-Category-X | Boolean | 1 if the event matches the category X of direction and breach type of the event; 0 otherwise. The four (4) categories for X are the elements of the cross product of (Intrusion, Exfiltration) X (Allowed, Blocked) |

CYBERANALYSIS WORKFLOW ACCELERATION

CROSS-REFERENCE TO RELATED APPLICATIONS

This application is a continuation of U.S. patent application Ser. No. 18/082,950, filed Dec. 16, 2022, and entitled "Cyberanalysis Workflow Acceleration" (now U.S. Pat. No. 11,797,671), which is a continuation of U.S. patent application Ser. No. 16/584,084, filed Sep. 26, 2019, and entitled "Cyberanalysis Workflow Acceleration" (now U.S. Pat. No. 11,574,047), which is a continuation of U.S. patent application Ser. No. 16/030,354, filed Jul. 9, 2018, and entitled "Cyberanalysis Workflow Acceleration" (now U.S. Pat. No. 10,503,899), which claims priority to U.S. Provisional Application No. 62/530,543, filed Jul. 10, 2017. The content of each of the above applications is hereby incorporated by reference into the present application.

BACKGROUND

Network security is becoming increasingly important as the information age continues to unfold. Network threats may take a variety of forms (e.g., unauthorized requests or data transfers, viruses, malware, large volumes of network traffic designed to overwhelm network resources, and the like). Many organizations subscribe to network-threat services that periodically provide information associated with network threats, for example, reports that include listings of network-threat indicators (e.g., network addresses, uniform resource identifiers (URIs), and the like), or threat signatures (e.g., malware file identifiers), or threat behaviors (e.g., characteristic patterns of advanced persistent threats). The information provided by such services may be utilized by organizations to identify threats against their networks and associated assets. For example, network devices may monitor network communications and identify any communications between endpoints with network addresses that correspond to threat indicators.

Once identified, these communications events may be logged, and the events logs may be provided to a cyberanalysis system or human cyberanalysts for further investigation into the nature and severity of, and potential remedial actions for, the threats events. Typically, the cyberanalysis system or cyberanalysts will determine that only a small portion of these logged threat events will be reportable, in the sense that the events should be reported to the proper authorities who may be responsible for executing the associated remedial actions and for ensuring the security of the network, and who may be responsible for enforcing regulatory compliances or reporting compliance violations. In many modern enterprise networks, however, the volume and creation rate of network threat event logs often overwhelms the human cyberanalysts' capacities for investigating all of the events. Thus, it is imperative that cyberanalysts' work be assigned efficiently. To that end, the cyberanalysis system or cyberanalysts should investigate only those events that have a high probability of being reportable events, and not waste time and effort investigating threat events that are unlikely to be reportable. Accordingly, there is a need for cyberanalysis workflow acceleration.

SUMMARY

The following presents a simplified summary in order to provide a basic understanding of some aspects of the disclosure. It is intended neither to identify key or critical elements of the disclosure nor to delineate the scope of the disclosure. The following summary merely presents some concepts of the disclosure in a simplified form as a prelude to the description below.

Aspects of this disclosure relate to cyberanalysis workflow acceleration. In accordance with embodiments of the disclosure, a TCP/IP network communications monitoring device may receive threat detection rules configured to cause the monitoring device to identify communications events that correspond to the threat detection rules. These rules may also include actions that may be applied, by the monitoring device, to packets that match the rules. For example, the rules may cause the monitoring device to block, allow, modify/transform, log, capture, or perform other actions to a packet based on the rules. The monitoring device may receive TCP/IP packets that compose endpoint-to-endpoint communications and, for each packet and the packet's associated communication, the monitoring device may determine that the packet and/or associated communication correspond to criteria specified by one or more threat detection rules. The criteria may correspond to one or more of the network-threat indicators, or one or more of the network threat signatures, or one or more of the network threat behavior patterns.

Upon threat detection, the monitoring device may log the packet, may aggregate the packet log into an event log for the associated communication, and may designate the communication as a threat event. The log may also include context information, such as the detection criteria, environmental information (e.g., time stamps, interface IDs, directionality), any actions applied to the packet by the monitoring device, or modifications to the packet made by the monitoring device. The information stored in these event logs is intended to facilitate a cyberanalysis of the risk and effects of the threat event, as well as any remedial actions that may be taken to mitigate the threat. The monitoring device may also capture the packets. Copies of captured packets may be stored in raw/unprocessed form. Each of the packets that compose the communication may be stored together in order to further facilitate a cyberanalysis of the threat event.

As the monitoring device produces event logs, the logs may be stored as tasks in a work queue, in the order of arrival time. The work queue may be presented to a cyberanalyst or cyberanalysis system via a user interface designed to assist event analysis. Via the user interface, the cyberanalyst or cyberanalysis system may select the event log at the head of the queue and begin to investigate it, thereby initiating the cyberanalysis workflow process on the event. The workflow may proceed as follows: the cyberanalysis system or the cyberanalyst reviews the event's information and may conduct an investigation; may make a determination of the event's type and severity, such as determining if the event caused critical asset damage or loss; may determine if there may be any mitigating or remedial actions, such as determining whether to remove malware from a host; and may report the event and any mitigating or remedial actions as a "finding" to the proper authorities, such as management and/or network security operations and/or regulatory agencies, or, the cyberanalysis system or the cyberanalyst may decide that the event is not a reportable finding, either of which may complete the workflow process. The cyberanalysis system may review and summarize event information received by the cyberanalysis system. The summary and/or event information may be presented or transmitted to a cyberanalyst user device with an inquiry to provide or determine any missing information, and may include suggested event type and severity determinations and suggested mitigating or remedial actions. If the event is not a reportable finding, the cyberanalyst's work is considered to have been "wasted" effort. Any time spent investigating an event that is not a reportable finding may be viewed as an inefficiency that may adversely affect the quality of cybersecurity because of, for example, opportunity costs. That is, the time spent investigating the non-reportable event may instead have been used to investigate a reportable finding.

To address reportable findings, a management device may need to take action on the finding, such as reporting the finding to authorities by transmitting reporting messages to authority network devices in order to be compliant with applicable regulations. Network security operations may be responsible for executing the mitigating actions associated with the finding. Upon completion of a single workflow process, the cyberanalysis system or the cyberanalyst may transmit a message to initiate a new workflow process by cycling back to the selection of a next event to analyze, execute a workflow on the next event, determine that the next event is either reportable or not reportable. This workflow cycle may be repeated until the cyberanalyst completes their work session or until the work queue has been emptied.

A major issue with cybersecurity operations is that in a typical cybersecurity environment with cyberanalysts who use conventional cyberanalysis applications and tools, the threat-event generation rate, or equivalently the work queue arrival rate, may far exceed a cyberanalyst's service rate for each event. If the cyberanalysis workflow cycle proceeds too slowly, the backlog, or queue, of events to be serviced may grow until the queue's maximum size is exceeded, at which time events may be dropped from the queue. Dropped events may never be investigated, and thus it may be the case that some potentially reportable events may never be discovered. This compromises cybersecurity.

One approach to addressing the issue is to increase the service rate of a threat event work queue. One way to do this is to add more cyberanalysts to service a threat event queue. In typical environments, however, it is not practical to increase the number of cyberanalysts sufficiently such that the queue's service rate matches the queue's event arrival rate.

Another way to increase the service rate is to reduce the average workflow cycle time, or equivalently to reduce the average service time per enqueued event, or task; that is, to accelerate the workflow. In a typical environment, most of the events may be determined to be low-risk, or false positives, and therefore not reportable. Thus, if there is a way to ensure that a cyberanalyst does not spend any time investigating events that would be deemed not reportable, then the cycle time is zero for such events, and the average workflow cycle time can be significantly reduced. Conversely, if there is a way to ensure that a cyberanalyst only investigates events that will be determined to be reportable, then the average workflow cycle time can be significantly reduced. In terms of the event queue, instead of ordering events in the queue by arrival time, which results in the oldest events being at the head of the queue, the events in the queue may be ordered, or sorted, by the likelihood of reportability (a probability value in [0,1]), which results in the most likely reportable events being at the head of the queue. To order the events in the queue by reportability likelihood, an algorithm that computes an event's reportability likelihood may be applied to each event arriving at the queue, and then subsequently the event may be inserted into the queue in sorted order. Events with a low likelihood of reportability may never be investigated by cyberanalysts and may be removed from the queue; then service time for such events is zero, and thus the average workflow cycle time for queued events is reduced, resulting in workflow acceleration.

A critical component of cyberanalysis workflow acceleration is the design of algorithms that compute an event's reportability likelihood. Before describing the nature of such algorithms, observe that if algorithms existed that computed an event's reportability likelihood with high accuracy, then there would be little need for human cyberanalysts to perform investigations; they could be wholly replaced by robots. To date, such high-accuracy algorithms have not been designed, and it is generally believed that it is infeasible for humans to design highly accurate algorithms using explicit programming methods. Also, algorithms that may be considered accurate for a particular network or area of the world may not be considered accurate when applied globally to events in all cybersecurity environments. That is, events considered reportable in one environment may not be considered reportable in a different environment, due to differing considerations about what events may be considered reportable. For example, consider two political nations A and B that may be mutually hostile or even in a state of war. Suppose there is a malware distribution server M attached to a network that is controlled and operated by nation A's military. Any networked communications with M may potentially be a malware distribution and therefore should be considered a threat risk. However, a communication between malware distribution server M and a host computer attached to a network controlled by nation A may not be considered a reportable event by nation A; conversely, a communication between malware distribution server M and a host computer attached to a network controlled by nation B may likely be considered a reportable event by nation B.

There may be two types of algorithms used to determine an event's estimated reportability likelihood: (1) human-designed (H/D) heuristic algorithms that may be explicitly programmed; and (2) machine-designed, or machine-learned (M/L), algorithms that may be produced by a machine learning system. To determine estimates for an event's reportability likelihood, H/D algorithms may classify event characteristics and/or mathematically combine measures of event characteristics, such as the fidelity of the event's threat indicator (URIs have higher fidelity than domain names, and domain names have higher fidelity than IP addresses), the age of the indicator, the threat intelligence provider(s) that supplied the indicator, the reputation of the threat intelligence provider(s), the reputation or risk score assigned by the threat intelligence provider(s) to the threat indicator, or other human-selected event characteristics. To determine an event's reportability likelihood, an M/L algorithm similarly combines event characteristics by correlating event characteristics with previously identified threat events. In contrast to H/D algorithms, an M/L algorithm may use many more characteristics and may combine those characteristics in more complex ways, e.g., by computing non-linear multi-variable functions, that may not be readily designed or explicitly programmed or well-understood by humans. The characteristics and combinations that result in accurate determinations of reportability may be learned by machine-learning systems that use approaches such as artificial neural networks (ANNs), genetic programming (GP), and the like, which typically use supervised learning methods. A machine learning system produces an M/L algorithm that computes a reportability likelihood value for a threat event.

Note that some of the event characteristics used by both the H/D algorithms and the M/L, algorithms are novel and are considered to be part of the disclosure.

To produce effective M/L, algorithms, machine learning systems that use supervised learning often require a significant volume of training data. The training data consists of threat event logs that have been categorized (by human cyberanalysts) into reportable findings (positive examples) and non-reportable events (negative examples). Thus, a potential issue with using M/L algorithms for cyberanalysis workflow acceleration is self-deadlock due to insufficient training data. That is, generating sufficient volumes of training data in a practical amount of time to produce highly accurate M/L algorithms for workflow acceleration may itself require workflow acceleration.

To avoid this potential deadlock, during the time that the M/L algorithm is not sufficiently accurate due to insufficient training, H/D heuristic algorithms may be used to determine reportability likelihoods of events and thereby achieve some degree of cyberanalyst workflow acceleration while generating training data. The training data may be used to generate M/L algorithms that, over time, may become very accurate at determining reportability likelihood. Then the M/L algorithms may be applied to events in the queue to order the events by reportability likelihood (possibly in combination with the H/D algorithms for reportability likelihood). Cyberanalysts investigate events at the head of the queue (which may be the events most likely to be reportable), and conclude their investigation, or workflow cycle, by labeling the event as either reportable or not reportable. Each event that a cyberanalysis system or cyberanalyst has investigated and labeled as reportable or not reportable may be fed back into the machine learning system as training data, which will be used to create an even more accurate M/L algorithm. Events in the sorted queue that have a reportability likelihood less than some threshold (which may be subjectively determined by the cyberanalyst) may be dropped from the queue, and dropped events may never investigated. As noted above, dropping events in the queue accelerates workflow.

Another reason to use H/D algorithms in combination with M/L algorithms to improve workflow acceleration is to address irregular and idiosyncratic events. A threat event may occur that will be deemed a reportable event when investigated by a cyberanalyst, but that does not correlate well with the patterns of previous reportable events used as training data for the M/L algorithm. Thus, the M/L algorithm will assign the event a low likelihood of reportability, whereas the H/D algorithm may assign it a higher likelihood of reportability. To make the overall system robust to such anomalies or to changes in threat event patterns (as is often the case in cybersecurity), reportability likelihoods computed by H/D algorithms may be combined with reportability likelihoods computed by M/L algorithms such that the combined likelihood is always greater than or equal to the larger of the H/D likelihood and the M/L likelihood (but always less than or equal to 1). Thus, even if the M/L likelihood is low, the combined reportability likelihood value used to sort the event in the queue should be greater than or equal to the H/D score.

The reportability likelihoods computed by different algorithms may be weighted. The H/D algorithms may be combined with reportability likelihoods computed by M/L algorithms such that the combined reportability likelihood is weighted to emphasize one of the algorithms. The system may be weighted to emphasize H/D algorithm. The system may use the H/D algorithm to determine a combined reliability until the amount of training data used to refine the M/L algorithm has reached a threshold. As the amount of training data increases, the weighting may be shifted to balance between the H/D likelihood and the M/L, likelihood.

Also, the historical data/training data used to generate M/L algorithms may be specific to a particular system/organization, particular network segment, or to a particular network analyst. For example, it's possible that a threat event(s) considered significant (i.e., worthy of a cyberanalyst's time & effort) in one market segment/critical infrastructure segment is not considered to be significant in a different market segment/critical infrastructure segment. Similarly, within a given segment, a threat event considered significant by one organization in a given segment is not considered significant by another organization in the same given segment. In addition, a threat event considered significant by one cyberanalyst is not considered significant by another individual cyberanalyst. As such, the M/L algorithms may vary based on the market/network segment, critical infrastructure segment, organization, or cyberanalysts providing the training data for that algorithm.

Thus, the training data used to develop correlation measurement algorithms that are "tuned" to a given segment, or organization, or individual cyberanalysts. This also means that multiple correlation measurement algorithms may be used at the same time, each algorithm being machine-learned/trained on a different set of training data.

A TCP/IP communications monitoring device, called a cyber threat intelligence (CTI) gateway, may be configured to detect and log communications that match threat indicators, signatures, behavioral patterns, and the like. When the device detects a threat communication, or threat event, the device may log the event and forward the event log to a work queue that contains tasks for the cyberanalysis system or cyberanalysts to investigate. Before inserting the event log in the queue, the event's reportability likelihood, a probability value between 0 and 1, may be individually computed by both an H/D algorithm and an M/L algorithm. The H/D algorithm's likelihood value and the M/L algorithm's likelihood value may be combined to produce an integrated reportability likelihood value, named R. The event log may be inserted into the work queue in sorted order, with the sorting criterion being the value of R for each event log in the queue, and with larger R values near the head of the queue. A device retrieves, pops, or removes the event log at the head of the queue (which may be the event log with the largest value of R among all the event logs in the queue) and transmits the event log to the cyberanalysis system or cyberanalyst to investigate it, and the cyberanalysis system or cyberanalyst determines whether the event is reportable or not reportable. If reportable, then the cyberanalysis system or cyberanalyst user device may create a report for the event which may include a recommendation for remedial action, or the cyberanalyst system or cyberanalyst may execute or recommend remedial action and include that information in the report. The event log may be forwarded to the machine learning system to be used as training data, in order to further improve the accuracy of the M/L algorithm. The report may be transmitted to the proper authorities who may be responsible for ensuring network security, executing the remedial actions, complying with applicable regulations, reporting compliance violations, and the like.

The workflow process and monitoring and logging processes may be repeated continually. The monitoring device detects and logs threat communication events, and forwards the events to the work queue. Events may be inserted into the queue in sorted order according to their R values, which may be computed by HID and M/L algorithms. The cyberanalysis system or cyberanalysts may retrieve, request, or be transmitted events from the head of the queue, investigate the events, and label them as reportable or not reportable. Investigated events, both reportable and not reportable, may be sent to the machine learning system for use as training data for creating more accurate M/L algorithms. The cyberanalysis system or cyberanalysts investigate event logs at the head of the queue until the R values fall below a threshold (which may be subjective). Event logs with an R value below some threshold may be dropped from the queue, and dropped event logs may never be investigated by cyberanalysts.

The above process accelerates workflow by reducing the average service rate, or investigation time, per event in the queue. The cyberthreat intelligence operation system may ensure cyberanalysts only investigate events with high R values, and do not spend any time investigating events with low R values (events with R values below some threshold).

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein:

FIG. 4 depicts a representative human-designed (H/D) heuristic algorithm for determining reportability likelihood for a communications event collected by a cyber threat intelligence gateway, in accordance with one or more aspects of the disclosure;

FIGS. 6a and 6b list features of communications events logs and associated measures that may be used as input to machine learning systems and to M/L algorithms for determining reportability likelihoods for communications events collected by cyber threat intelligence gateways, in accordance with one or more aspects of the disclosure.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the disclosure. In addition, reference is made to particular applications, protocols, and embodiments in which aspects of the disclosure may be practiced. It is to be understood that other applications, protocols, and embodiments may be utilized, and structural and functional modifications may be made, without departing from the scope of the disclosure.

Various connections between elements are discussed in the following description. These connections are general and, unless specified otherwise, may be direct or indirect, wired or wireless, physical or logically defined. In this respect, the specification is not intended to be limiting.

Figure 1:
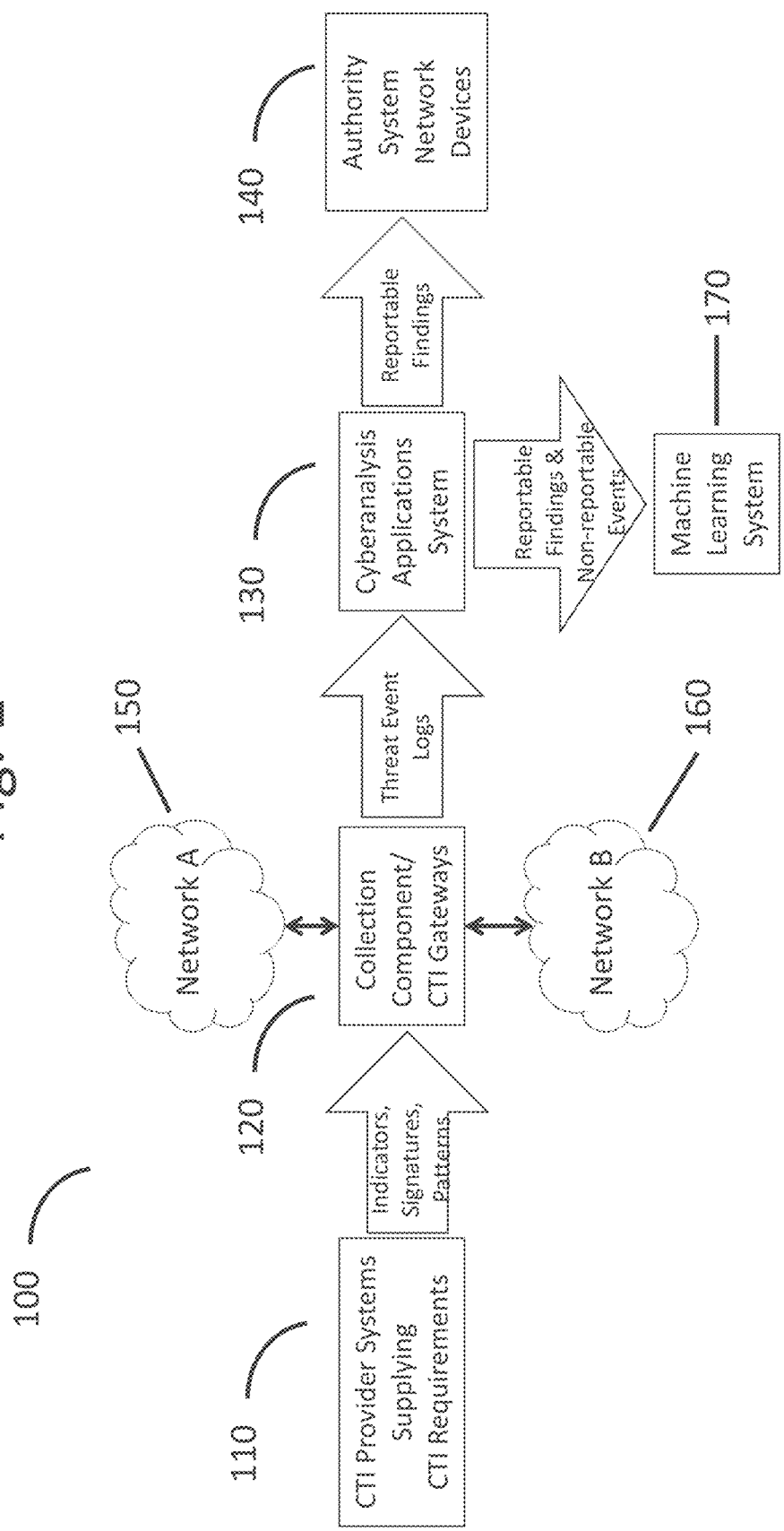
FIG. 1 depicts an illustrative functional diagram of a cyber threat intelligence (CTI) operational environment for cyberanalysis workflow acceleration, in accordance with one or more aspects of the disclosure.

FIG. 1 depicts an illustrative functional diagram of a cyber threat intelligence (CTI) operational environment for cyberanalysis workflow acceleration in accordance with one or more aspects of the disclosure. Referring to FIG. 1, the CTI operational system 100 may include functional components of a typical cyber threat intelligence (CTI) operational cycle. CTI Requirement Component 110 gathers cyber threat intelligence from various providers in the form of: threat indicators, for example IP addresses, domain names, and URIs of Internet-attached endpoints that may be controlled by malicious actors; threat signatures, for example an MD5 hash of a malware file; and threat behavioral patterns, for example a file with an .mp3 extension that makes system calls. CTI Requirement Component 110 distributes the CTI to the Collection Component 120, which may be implemented by CTI gateways. CTI gateways may be network appliances that inspect network communications for matches with the CTI. The Collection Component or CTI-Gateway 120 may be located within network A 150, at or near the interface between network A 150 and network B 160. For example, suppose a host desktop computer attached to network A 150, for example an enterprise local-area network (LAN), sends a web Hypertext Transfer Protocol (HTTP) request with the Uniform Resource Locator (URL) http://www.malware-server.net/directory-aaa/a87gah.exe to a web server www.malware-server.net attached to Network B 160, which may be the Internet. If the Collection Component or CTI-Gateway 120 is searching network communications for the threat indicator www.malware-server.net, then it will detect the HTTP request and may log the resultant HTTP session as a threat event. Collection Component or CTI-Gateway 120 sends threat event logs to Cyberanalysis Application System 130. The Cyberanalysis Application System 130 may include functions executed by cyberanalysts using threat event analysis applications such as security information and event management (SIEM) applications to investigate the events and determine if the events should be reported to authorities. The reports may include remedial actions. Cyberanalysis Application System 130 sends any reportable findings to Authority System Network Devices 140. The Authority System Network Devices 140 may be implemented by entities with the authority to execute the remedial actions, for example, to disconnect a host computer from a network and sweep it for malware. Cyberanalysis Application System 130 also transmits any reportable event findings and any non-reportable events to Machine Learning System 170, where they may be stored and may be used as training data.

In a CTI operational system 100, often the Cyberanalysis Application System 130 is a bottleneck. The generation rate of threat event logs by Collection Component 120, or equivalently the arrival rate of threat event logs to the Cyberanalysis Application System 130, significantly exceeds the rate at which the Cyberanalysis Application System 130 processes the threat event logs, or the rate at which the cyberanalysts investigate the threat events. The result is that only a small percentage of the events may be investigated. Furthermore, of the events that may be investigated, often only a small percentage of investigated events may be determined to be reportable findings. For example, in a typical enterprise network environment, there may be many port scanning attacks on the enterprise's public-facing servers, which may be readily blocked by, for example, a network firewall. These blocked scanning attack events may be logged and sent to the Cyberanalysis Application System 130, but because the attacks may be common and were blocked, the cyberanalysts will not report them to authorities. The CTI operational system 100 mitigates the bottleneck by computing reportability likelihood values for the events, and ordering the events in the work queue by reportability likelihood, so that cyberanalysts only investigate events with a high likelihood of being reportable. This significantly reduces the average service time for investigating events, thereby accelerating cyberanalysis workflow.

Figure 2:
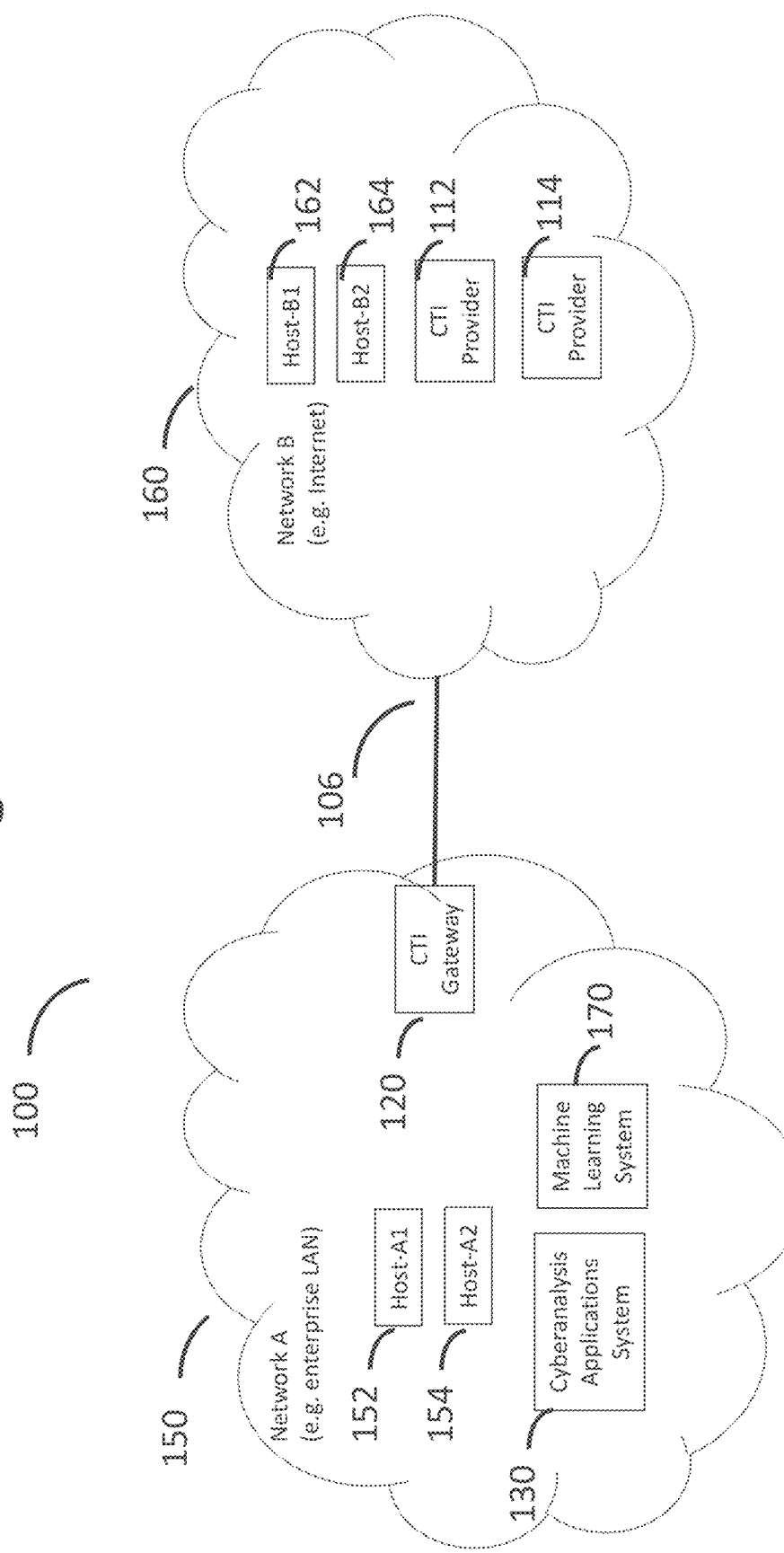
FIG. 2 depicts an illustrative TCP/IP network environment for a CTI operational system with cyberanalysis workflow acceleration in accordance with one or more aspects of the disclosure.

FIG. 2 depicts an illustrative system diagram of a network environment for cyberanalysis workflow acceleration in accordance with one or more aspects of the disclosure. Referring to FIG. 2, the CTI operational system 100 may include one or more networks. For example, the CTI operational system 100 may include network A 150 and network B 160. Network A 150 may comprise one or more networks (e.g., Local Area Networks (LANs), Wide Area Networks (WANs), Virtual Private Networks (VPNs), Software-Defined Networks (SDNs), or combinations thereof) associated with, for example, one or more individuals or entities (e.g., governments, corporations, service providers, or other organizations). Network B 160 may comprise one or more networks (e.g., LANs, WANs, VPNs, SDNs, or combinations thereof) that interfaces network A 150 with one or more other networks (not illustrated in FIG. 2). For example, network B 160 may comprise the Internet, or a similar network, or portions thereof, which interconnects many public and private networks such as network A 150.

The CTI operational system 100 may also include one or more hosts, such as computing or network devices (e.g., servers, desktop computers, laptop computers, tablet computers, mobile devices, smartphones, routers, gateways, switches, access points, or the like). For example, network A 150 may include endpoints Host-A1 152 and Host-A2 154, as well as host infrastructure (not shown in FIG. 2) for supporting systems such as a Cybernalysis Applications System 130 and a Machine Learning System 170. Hosts 152 and 154 may support, for example, HTTP client applications (web browsers) that access HTTP servers (web sites) attached to the Internet. Network A 150 may also include a plurality of Collection Component or CTI Gateway devices 120, which may typically be located at or near the network perimeter and which inspect network traffic transiting across network links 106 connecting networks such as network A 150 and network B 160. The Collection Components or CTI Gateway devices 120 may detect threat events that correspond to CTI, and log and capture the events, and send the logs to the Cybernalysis Applications System 130, for investigation by cyberanalysts.

Network B 160 may include endpoints Host-B1 162 and Host-B2 164, and as well as host infrastructure (not shown in FIG. 2) for supporting CTI Providers systems 112 and 114. Host devices 162 and 164 may support, for example, HTTP server applications (web sites) that may be operated or controlled by malicious actors that may compromise endpoints with HTTP clients, for example host devices 152 and 154, that establish sessions with the HTTP servers. CTI providers systems 112 and 114 may be associated with services that monitor network threats (e.g., threats associated with threat hosts 162 and 164) and disseminate, to subscribers such as Collection Components or CTI Gateways 120 and Cybernalysis Applications Systems 130, cyber threat intelligence reports. The cyber threat intelligence reports may include network-threat indicators (e.g., network addresses, ports, fully qualified domain names (FQDNs), uniform resource locators (URLs), uniform resource identifiers (URIs), or the like) associated with the network threats; network threat signatures (e.g., MD5 hashes of malware files); and network threat behavior patterns (e.g., files with data extensions that may be executing processes, communications indicative of I2P nodes, and the like), as well as other information associated with the network threats, for example, the type of threat (e.g., phishing malware, botnet malware, or the like), geographic information (e.g., International Traffic in Arms Regulations (ITAR) country, Office of Foreign Assets Control (OFAC) country, geoIP data, or the like), anonymous networks and darknets (e.g., Tor network, I2P network, and the like), and malicious actors (e.g., the Russian Business Network (RBN), the Syrian Electronic Army (SEA), APT1, and the like).

Figure 3:
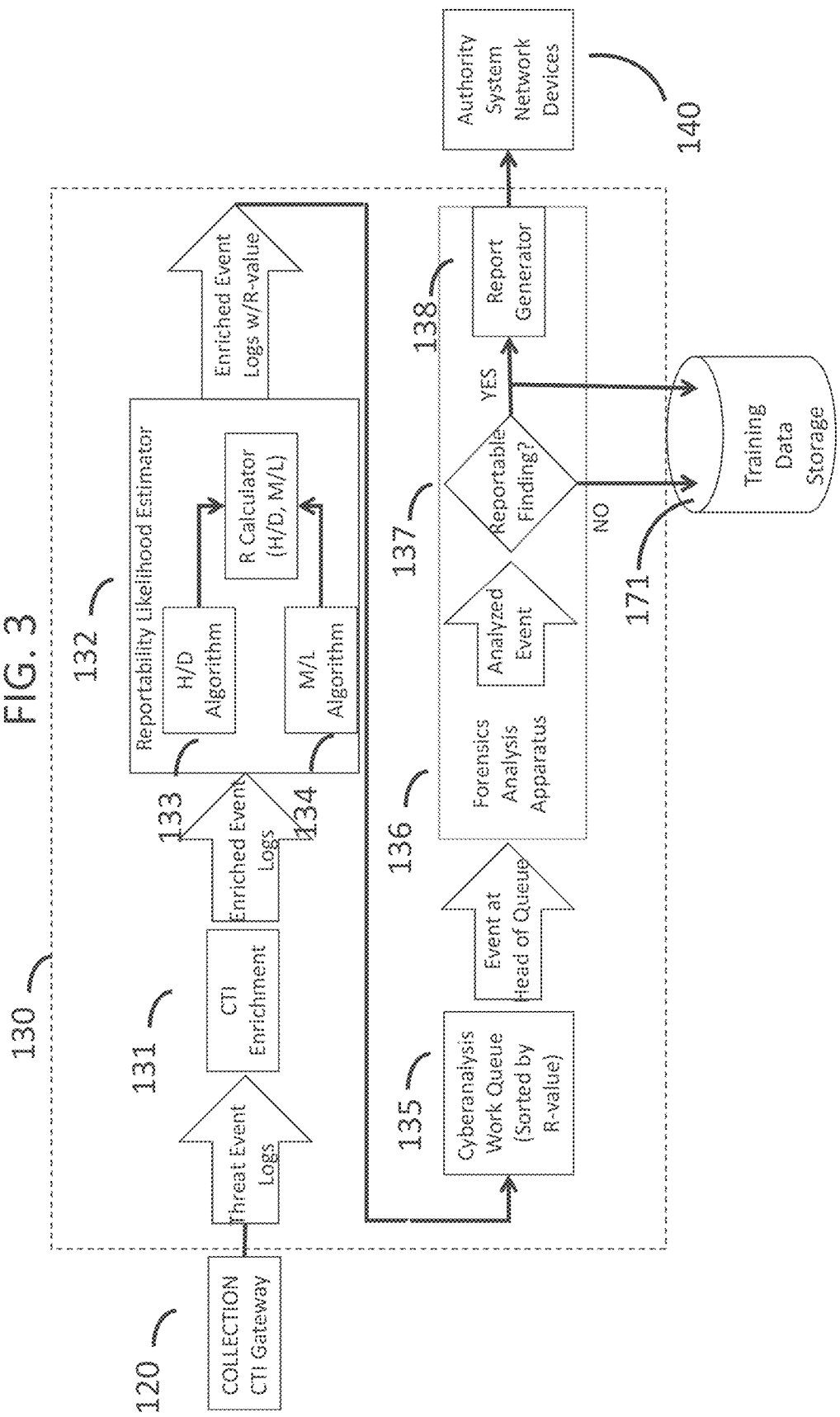
FIG. 3 depicts an illustrative functional environment for a cyberanalysis workflow application process in accordance with one or more aspects of the disclosure.

FIG. 3 depicts an illustrative environment for a cyberanalysis workflow application process in accordance with one or more aspects of the disclosure. Referring to FIG. 3, the Cyberanalysis Application System 130 corresponds to the Cyberanalysis Application System 130 depicted in FIGS. 1 and 2. The Cyberanalysis Application System 130 may include one or more processors, memories, and/or network interfaces. The functions and steps described herein may be embodied in computer-usable data or computer-executable instructions, such as in one or more program modules, executed by one or more computers or other devices to perform one or more functions described herein. Generally, program modules include routines, programs, objects, components, data structures, etc. that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, etc. As will be appreciated, the functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

The input to Cyberanalysis Application System 130 is threat event logs produced by the Collection Component or CTI-Gateway system 120 (external to Cyberanalysis Application System 130), which corresponds to the Collection Component 120 depicted in FIG. 1 and the Collection Component or CTI Gateway system 120 depicted in FIG. 2. The Collection Component or CTI-Gateway 120 produces threat event logs, which may be derived from communications that match CTI supplied by CTI providers such as CTI Providers 112 and 114 depicted in FIG. 2, and which may be currently being applied by the Collection Component or CTI-Gateway 120 to network communications between networks such as network A 150 and network B 160 depicted in FIG. 2.

The event logs may be received and processed by CTI Enrichment apparatus 131. CTI Enrichment apparatus 131 adds additional data to the threat logs that is derived from CTI providers and that may be used to compute reportability likelihood determinations. This data enrichment may include, for example, the names of all the CTI providers that supplied the indicator(s), signature(s), or behavioral pattern(s) that caused the Collection Component or CTI Gateway 120 to create the event log; the CTI providers' reputation or risk scores for the indicator(s), signature(s), or behavioral pattern(s); the age of the indicator(s), signature(s), or behavioral pattern(s); the class or category of the potential threat; the actors who created the threat; the behavior of the threat and the asset damage it may cause; and the like.

The enriched event logs may be received and processed by the Reportability Likelihood Estimator apparatus 132. The Reportability Likelihood Estimator 132 computes a likelihood, or probability value in [0,1], that the cyberanalysts or cyberanalysis system will determine that the event is a reportable finding. The Reportability Likelihood Estimator 132 uses two types of algorithms to determine estimated reportability likelihoods: (1) heuristic, human-designed (H/D) algorithms; and (2) machine-learned (M/L) algorithms. The two types of algorithms may provide complementary benefits. Human cyberanalysts expect that H/D algorithms may be, on average, not as accurate as well-trained M/L, algorithms at determining estimated likelihoods, because determining reportability of events requires human-level intelligence, intellectual skills, reasoning, and context awareness and understanding that may be not easily emulated by algorithms that have been designed and explicitly programmed by humans using conventional computer programming languages and methodologies. An H/D algorithm does not automatically learn and thus does not improve its performance over time as an estimator. Conversely, well-trained M/L, algorithms will recognize complex patterns in event characteristics that discriminate between events that may be reportable findings and events that may not be reportable findings. In effect, an M/L algorithm has learned how to emulate the human cyberanalyst's reasoning, much of which is implicit knowledge that is difficult for humans to explicitly program as computer logic. However, M/L algorithms' accuracy at estimating reportability likelihoods is directly correlated with the quality of the training data used as input to the machine learning system 170 in FIG. 2. High-quality training data consists of large sets of reportable findings (positive examples) and non-reportable events (negative examples), which have event characteristics that cover a broad range of possible values. Thus, until an M/L algorithm has been well-trained with large sets of positive and negative examples that may be a sufficiently dense sampling of the feature space of possible events, then an M/L algorithm is not expected to give accurate estimation determinations.

Over time, as cumulatively more positive and negative examples may be added to the training data for the machine learning system (170 in FIG. 2), the M/L algorithm's accuracy at determining reportability likelihoods will improve. Until then, it may be the case that for a given new event that is received by the Reportability Likelihood Estimator 132, the H/D algorithm processor 133 is more accurate than the M/L algorithm processor 134. To account for deficiencies in the training data and the time it may take to create sufficient training data that will result in accurate estimation determinations by the M/L algorithm processor 134, some way of combining a determination produced by the M/L algorithm processor 134 and a determination produced by the H/D algorithm processor 133 is needed. The Reportability Likelihood Estimator 132 combines the two determinations to produce a single likelihood determination, called the R-value. Algorithms for combining the two determinations to produce the R-value can take many forms, but one constraint is they should preserve the property that the R-value is a probability, that is, the R-value is in [0, 1]. The calculated R-value may have the property that R-value is greater than or equal to both of the estimation determinations produced by the H/D 133 and M/L 134 algorithm processors (and because it is a likelihood, or probability, R-value is in [0,1]). For example, the Reportability Likelihood Estimator 132 may use a simple combining algorithm to set R-value to the larger of the output of the H/D 133 and M/L 134 algorithm processors. The Reportability Likelihood Estimator 132 may add the calculated R-value to the enriched event log and forwards the log to the Cyberanalysis Work Queue system 135.

The Cyberanalysis Work Queue system 135 receives the enriched event log (with an assigned R-value) and inserts the enriched event log, which may now be viewed as a task for the cyberanalysts or cyberanalysis system, into the Cyberanalyst Work Queue in R-value sorted order. For example, an event log A with an R-value of X will be located closer to the front, or head, of the queue than an event log B with an R-value of Y, if X is larger than or equal to Y. Thus, the task at the head of the queue has the greatest R-value of all tasks in the queue; and the task at the tail of the queue has the lowest R-value of all tasks in the queue.

A Forensics Analysis Application device 136, such as a SIEM application, retrieves, or pops/removes, the task at the head of the queue, receives the task, and presents the task via an interface (e.g. a graphical user interface displayed on a display) to the human cyberanalyst. The cyberanalyst may use the Forensics Analysis Application device 136 to investigate the event. The cyberanalyst may enter a decision unit 137 in the Forensics Analysis Application regarding whether the event is a reportable finding or a non-reportable finding, and labels the event log accordingly. If YES, the event, or reportable finding, is transmitted to and received by a Report Generator application system 138, which creates a report that may include remedial actions. The report generated by Report Generator 138 is sent to Authority System Network Devices 140 (which may be external to Cyberanalysis Application System 130 and which corresponds to Authority System Network Devices 140 in FIG. 1), which may be operated by entities who may be responsible for any compliance enforcement and/or who may be authorized to execute the remedial actions. In Step 8, the Analyzed Event, which may be either a reportable finding (positive example) or a non-reportable event (negative example) is stored in a Training Data Store 171, which is a component of the Machine Learning System 170 (depicted in FIGS. 1, 2, and 5).

The Cyberanalysis Application System 130 repeatedly processes tasks from the head of the queue until either the work queue is empty, or the cyberanalyst decides to stop working because the R-value of the task at the head of the queue is below some threshold value, such that further work will decrease cyberanalyst work efficiency to unacceptable levels. When the latter situation occurs, the Cyberanalysis Application System 130 or proper authority may drop the tasks remaining in the queue. The dropped tasks may be archived and may be investigated at a later time, for example, when sufficient cyberanalyst work capacity is available or when further analysis by an improved M/L algorithm indicates an increased R-value. When a new task (event log) arrives that has an R-value greater than the threshold, the Cyberanalysis Application System 130 may automatically transmit an alert to the cyberanalysts, for example via a user interface notification, text message, e-mail, telephone call, and the like.

FIG. 4 depicts an exemplary human-designed (H/D) heuristic algorithm decision table (which may be implemented in the H/D algorithm processor 133 in FIG. 3) for determining a reportability likelihood for a communications event collected by a cyber threat intelligence gateway, in accordance with one or more aspects of the disclosure. In this case, the cyber threat intelligence (CTI) category is threat indicators in the form of network addresses (e.g., IP addresses, fully-qualified domain names (FQDNs), and URLs). The output of the H/D algorithm processor 133 is a Reportability Likelihood value in [0, 1], shown in the leftmost column of the table. The input to the algorithm processor 133 is an enriched event log, which contains fields for the "Indicator_Type", the "Indicator_Age", and the "CTI_Score". Indicator_Type values include "IP" for an IP address indicator, "FQDN" for an FQDN indicator, and "URL" for a URL indicator. The Indicator_Age and CTI_Score fields and values may be created by CTI Enrichment 131 (shown in FIG. 3). Indicator_Age values may be ranges with units of days. CTI_Score values may be one of {High, Medium, Low}. To determine a reportability likelihood, the H/D algorithm may use conditional logic and Boolean logic applied to the event field values. For example, the second row of the table may represent a computer program statement "IF ((Indicator_Type==FQDN) AND ((0<=Indicator_Age<30) OR (CTI_Score==High))) THEN Reportability_Likelihood:=0.7". For example, the eighth row of the table may represent a computer program statement "IF (((Indicator_Type==FQDN) OR (Indicator_Type==IP)) AND (180<=Indicator_Age)) THEN Reportability_Likelihood:=0.1".

The H/D algorithm utilizes a correlation between an event's reportability likelihood and the fidelity and age of the CTI indicator that matched the event's network address. This correlation is heuristic knowledge provided by (human) cyberanalysts that is captured in the H/D algorithm of FIG. 4. The fidelity of an indicator maps directly to the Indicator_Type value. Indicators with an Indicator_Type value of "URL" have the highest fidelity, because a URL maps to a single networked (malicious) resource (e.g., a malware executable file). Because of this one-to-one mapping of threat indicator to threat resource, the likelihood that the associated event will be reportable should be high. Indicators with an Indicator_Type value of "FQDN" have lower fidelity than "URL" because a single FQDN can map to multiple URLs, or multiple networked resources, some portion of which may be non-malicious. Because of this one-to-many mapping of a single threat indicator to potentially multiple resources, some portion of which may not be malicious, the likelihood that the associated event will be reportable should be lower than the reportability likelihood for an event that was detected by a URL indicator. Similarly, indicators with an Indicator_Type value of "IP" have lower fidelity than "FQDN" and (transitively) "URL" because a single IP Address can map to multiple FQDNs, or multiple networked resources, some portion of which may be non-malicious.

Indicator_Type value, or equivalently fidelity, may be viewed as the primary sorting criteria, and Indicator_Age may be viewed as the secondary sorting criteria. Referencing FIG. 4, for Indicator_Type values "FQDN" and "IP", the age of the indicator factors into reportability likelihood. The indicator's age is the quantity of days since the indicator was first reported by the cyber threat intelligence provider to the present day. Reportability likelihood decreases as the age of the indicator increases. CTI_Score values, assigned by the CTI provider, may also be used as a secondary sorting criteria. For the H/D algorithm represented in FIG. 4, CTI_Score and Indicator_Age may be treated equivalently, and thus may substitute for each other in the case that the CTI provider does not supply values for either Indicator_Age or CTI_Score.

Figure 5:
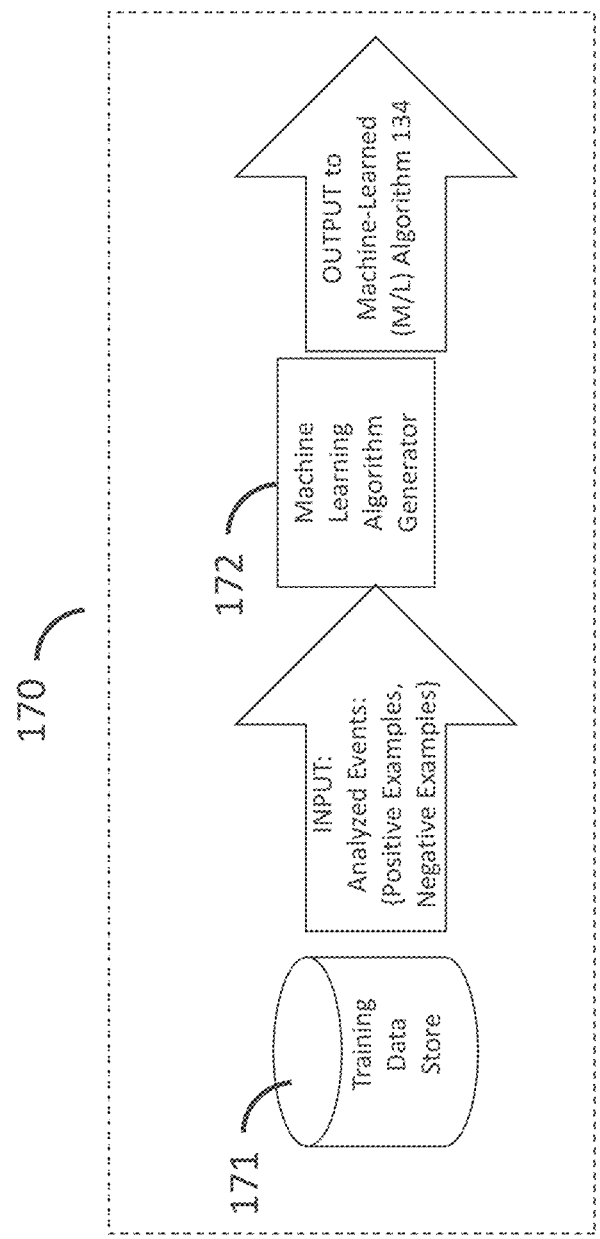
FIG. 5 depicts a machine learning system for creating machine-learned (M/L) algorithms for determining reportability likelihood for a communications event collected by a cyber threat intelligence gateway, in accordance with one or more aspects of the disclosure.

FIG. 5 depicts an exemplary machine learning system 170 (which corresponds to the machine learning system 170 in FIG. 1 and FIG. 2), which creates machine-learned (M/L) algorithms (such as an algorithm for the M/L algorithm processor 134 in FIG. 3) for determining reportability likelihood for a communications event collected by a cyber threat intelligence gateway, in accordance with one or more aspects of the disclosure. The input for the machine learning algorithm generation engine 172 is enriched event logs that have been previously analyzed by cyberanalysts, labeled as either reportable findings (positive examples) or non-reportable events (negative examples), and stored in a Training Data Store 171 for later use as training data for a machine learning algorithm generation engine such as 172. The output of the machine learning algorithm generation engine 172 is a machine-learned (M/L) algorithm for M/L algorithm processor 134, which corresponds to M/L algorithm processor 134 in FIG. 3, that determines the reportability likelihood of threat events.

The machine learning algorithm generation engine 172 may be any supervised learning algorithm, such as artificial neural networks, genetic programming, and the like. Training data for supervised learning algorithms is composed of labeled training examples; in the present disclosure, the training examples may be analyzed event logs labeled as either reportable findings (positive examples, with label value +1) or non-reportable events (negative examples, with label value 0). The machine learning algorithm's objective is to learn the function F that maps each input, which is a training example in the training data, to its output, which is +1 for positive training examples and 0 for negative training examples. After the machine learning algorithm generation engine 172 has generated the M/L algorithm that accurately maps positive training examples to +1 and negative training examples to 0, then the M/L algorithm processor 134 may be used to determine reportability likelihoods of newly generated event logs. That is, the M/L algorithm processor 134 may be used to analyze event logs that were not used as training examples in the training data. M/L algorithm processor 134 may then be embedded in a Reportability Likelihood Estimator 132 (ref. FIG. 3) that may be a component in a Cyberanalysis Applications System 130 (ref. FIG. 3).

Note that the choice of label values 0 and +1 for the training examples is deliberate, and part of this disclosure. Because these label values may be used during training, the resultant M/L algorithm processor 134 will output a value between 0 and +1 inclusive, or [0, 1], when the M/L algorithm processor 134 is being used to evaluate an event log (input) that was not a training example. Thus, the output of M/L algorithm 134 may be interpreted as a probability, or likelihood, that the input event log is a reportable finding.

The accuracy of a determination of the M/L algorithm processor 134 depends in part on the quality of the training data used by the machine learning algorithm generation engine 172 to create the M/L algorithm processor 134. The quality of the training data, and ultimately the accuracy of the determination, depends on the quality of the feature vector derived from the event log. The feature vector for an event log, and not the raw data of the event log, is the actual input to the machine learning algorithm generation engine 172 and the M/L algorithm processor 134. A feature vector is an array of numeric values, with each numeric value being a measure of some feature, or characteristic, of the event. For example, the size, measured in bytes, of the file that was transferred by the communications event is a characteristic that may compose an element or elements in the feature vector. A high quality feature vector is one that incorporates a large set of highly uncorrelated event characteristics that (a) causes the machine learning algorithm generation engine 172 to rapidly converge on the M/L algorithm during training; and (b) causes the M/L algorithm processor 134 to produce accurate reportability likelihoods.

The present disclosure includes features, or characteristics, of a feature vector for use in determining reportability likelihoods for cyberanalysis workflow acceleration. FIGS. 6a and 6b lists these characteristics and associated information. Note that in general, these features and their associated values may be designed to measure or quantify a human's perception of the threat risk, and therefore reportability likelihood, of an event, based on the values of fields in the event log.

"CTI-Prvdr-{1,N}" are the names of the N CTI provider entities (ref 112 and 114 in FIG. 2) that are supplying CTI, e.g., threat indicators, signatures, and behavioral patterns, to the Collection Component or CTI-Gateway 120 and Cyberanalysis Applications System 130 (ref. FIG. 2). This CTI provider information is added to the event log by CTI Enrichment 131 (ref. FIG. 3). The numeric value of a CTI-Prvdr-X feature is 1 if the CTI Provider has the indicator/signature/pattern that matched the event in its CTI database; otherwise, the value is 0. For example, suppose there are eight (8) CTI provider entities in total (and therefore eight features CTI-Prvdr-1, CTI-Prvdr-2, ... CTI-Prvdr-8), and for a given event, three (3) CTI provider entities CTI-Prvdr-2, CTI-Prvdr-5, and CTI-Prvdr-7 have the indicator/signature/pattern that matched the event in their CTI databases; then the associated feature vector is (0, 1, 0, 0, 1, 0, 1, 0).

"Norm-PolyGram-Entropy-LL-e2LD" is a normalized measure of the information entropy of the polygram probability distribution of the leading label of the effective $2^{nd}$-level domain of the fully qualified domain name (FQDN) that may be included in the event log, for example, if the associated communications event is an HTTP session between an HTTP client (e.g., a web browser application) and an HTTP server (e.g., a web server) with an FQDN (e.g., www.company-web-server.com) found in a domain name system such as the Internet's DNS. Informally, "Norm-PolyGram-Entropy-LL-e2LD" measures the human-perceived randomness of a domain name, which may capture a cyberanalyst's intuition that such a domain name may be indicative of a reportable event. Because domain names of legitimate, non-malicious Internet-attached hosts may often be created by humans and formed from human-readable words (e.g., www.company-web-server.com), whereas domain names of malicious Internet-attached hosts may often be machine-generated random strings and therefore not recognized as words by humans (e.g., www.4aiu68dh3fj.com), this measure may have some value as a feature for an M/L, algorithm 134 to learn to discriminate between events that may be reportable findings and events that may not be reportable.

More formally, the $2^{nd}$-level domain name (2LD) of an FQDN, for example such as "www.company-web-server.com" is "company-web-server.com", and the leading label (LL) of the 2LD is "company-web-server". The effective $2^{nd}$-level domain name (e2LD), for example, of the FQDN www.company-web-server.co.uk is "company-web-server.co.uk". For FQDNs such as "www.company-web-server.co.uk", the e2LD "company-web-server.co.uk" better captures domain ownership than the 2LD "co.uk", and is therefore a better feature for use in the present disclosure than 2LD. Note that the 2LD and e2LD of "www.company-web-server.com" may be the same, i.e., "company-web-server.com". Note also that for some FQDNs, for example 447a7a44.ksfcradio.com, the leading label of the e3LD ("447a7a44"), when an e3LD exists, may be the better feature than the leading label of the e2LD; similarly, for the e4LD for some FQDNs, for example 447a7a44.web.ksfcradio.com. Hence, additional features "Norm-PolyGram-Entropy-LL-e3LD" and or "Norm-PolyGram-Entropy-LL-e4LD" may also be used, when they exist.

The information-theoretic entropy value for a set of N probabilities $P=\{p_1, p_2, p_3, \ldots p_N\}$ is computed as Entropy $(P)=-\Sigma_i\ p_i\ \log_2\ p_i$ (for i=1 ... N), where $\log_2$ is the base-2 logarithm function. For the present disclosure, one way to apply the Entropy( ) function to leading labels of domain names is first to choose the probability distribution to be the relative frequencies, or probabilities, of occurrence of alphabetical characters in English text. For example, it is well-known that the letter "e" is the most common alphabetical character used in English text, and its empirical probability value is approximately 13%. Then, apply this distribution to each of the alphabetical characters, or unigrams, in the leading label of the effective $2^{nd}$ level domain. For example, for the domain name "www.mysite.com" with "mysite" being the leading label of the effective $2^{nd}$ level domain, $P_{ex1}=\{p(\text{"m"}), p(\text{"y"}), p(\text{"s"}), p(\text{"i"}), p(\text{"t"}), p(\text{"e"})\}$, where the probability values p("[letter]") may be selected from some empirical probability distribution of alphabetical characters, or letters, in English text. Then compute Entropy $(P_{ex1})$.

An issue with using the above Entropy($P_{ex1}$) computation in the feature "Norm-PolyGram-Entropy-LL-e2LD" is that the Entropy($P_{ex1}$) value is the same for "www.mysite.com" as for "www.eytmsi.com"; thus, it does not discriminate between random character strings and character strings for English words, or in the context of the present disclosure, it does not quantify the human perception that "eytmsi" is random, and therefore suspect, but "mysite" is human readable. To better achieve discrimination and capture human perception, probability distributions for bigrams (consecutive pairs of characters) or trigrams (consecutive triples of characters), or generally polygrams, in English text may be used instead of probability distributions for unigrams. For example, the set of bigrams of "mysite" is {"my", "ys", "si", "it", "te"}, and the set of trigrams is {"mys", "ysi", "sit", "ite"}. Also, the set of bigrams of "eytmsi" is {"ey", "yt", "tm", "ms", "si"} Then for $P_{ex2}=\{p(\text{"my"}), p(\text{"ys"}), p(\text{"si"}), p(\text{"it"}), p(\text{"te"})\}$ and $P_{ex3}=\{p(\text{"ey"}), p(\text{"yt"}), p(\text{"tm"}), p(\text{"ms"}), p(\text{"si"})\}$, where the probability values p("[bigram]") may be selected from some empirical probability distribution of bigrams in English text, Entropy $(P_{ex3})>$Entropy$(P_{ex2})$, which measurably quantifies the concept that the human-perceived randomness of "eytmsi" is greater than that of "mysite". Thus, when computing this feature "Norm-PolyGram-Entropy-LL-e2LD", bigrams or trigrams (or more generally, polygrams), should be used instead of unigrams.

Because domain name labels may be allowed to include numeric characters, as well as hyphens, it may be useful to remove non-alphabetical characters from the labels before applying the Entropy( ) function to a label's probability distribution of its polygrams. Alternatively, an empirical probability distribution of polygrams for labels of domain names created by humans for legitimate purposes may be used.

Finally, a normalization may be applied to the Entropy( ) computation to account for differences in string length, because in general, longer strings will have greater Entropy( ) values than shorter strings. For example, a human will perceive that the domain name www.ajiduvb.com has the same or similar randomness as www.ajiduvbgyxtz.com, whereas the Entropy( ) value for www.ajiduvbgyxtz.com will be approximately twice that of www.ajiduvb.com. To normalize for differences in string length, divide the Entropy( ) value by the base-2 logarithm ($\log_2$ in common notation), of the size of the set of bigrams, or trigrams, or more generally polygrams. For example, the set of bigrams $P_{ex2}=\{$"my", "ys", "si", "it", "te"$\}$ of "mysite" has size=5, so divide Entropy($P_{ex2}$) by $\log_2(5)$ to normalize.

"Numeric-Head-LL-e2or3LD" is a Boolean-valued feature that is 1 (True) if the first character of the leading label of the effective $2^{nd}$-level domain or of the effective $3^{rd}$-level domain is a numeric character (a decimal digit); and 0 (False) otherwise. Humans that are creating legitimate domains tend not to use numeric characters at the beginning (head) of a domain name; and thus a human cyberanalyst may perceive that a domain name label with a numeric head is suspicious.

"String-Length-LL-e2LD-Bin-X-Y" and "String-Length-LL-e3LD-Bin-X-Y" are Boolean-valued features that may be 1 (True) if the string length, measured in bytes, of the leading labels of the effective $2^{nd}$-level domain or of the effective $3^{rd}$-level domain are in the range [X, Y] inclusive; and 0 (False) otherwise. A bin partitioning, for example, of string lengths may be [1,4], [5-8], [9-16], [17-32], [33, 63], and [64, inf]. The last bin [64, inf] is for illegally long labels, which should not exceed 63 bytes (RFC 1035). With this exemplary bin partitioning, there will be six (6) features with names "String-Length-LL-e2LD-Bin-X-Y" with "X-Y" values corresponding to the partition bounds.

"TLD-Category-{g, s, cc, other}" are Boolean-valued features that may be 1 (True) if the top-level domain of the FQDN that may be included in the event log is in one of the IANA-defined top-level domain groups gTLD, or sTLD, or ccTLD, or other; and 0 (False) otherwise.

"Time-of-Day-Bin-X-Y" are Boolean-valued features that may be 1 (True) if the time-of-day that the event occurred is in the range [X, Y); and 0 (False) otherwise. A bin partitioning, for example, of times-of-day with cyber relevance may be [0200, 0600), [0600-0800), [0800, 1000), [1000, 1200), [1200, 1400), [1400, 1600), [1600, 1800), [1800, 2200), and [2200, 0200). With this exemplary bin partitioning, there will be nine (9) features with names "Time-of-Day-Bin-X-Y" with "X-Y" values corresponding to the partition bounds.

"Weekend-or-Holiday" is a Boolean-valued feature that is 1 (True) if the day the event occurred was a weekend or holiday; and 0 (False) otherwise.

"Flow-Byte-Count-Bin-X-Y" are Boolean-valued features that may be 1 (True) if the size, measured in bytes, of the content information, for example, the payloads of the TCP or UDP packets, of the event is in the range [X, Y); and 0 (False) otherwise. A bin partitioning, for example, of sizes may be [0,8), [8,64), [64,512), [512, 4K), [4K, 32K), [32K, 256K), and [256K, inf). With this exemplary bin partitioning, there will be seven (7) features with names "Flow-Byte-Count-Bin-X-Y" with "X-Y" values corresponding to the partition bounds.

The "Percentage-Digits-FQDN" feature's value is in [0, 1] and is the percentage of numeric characters in the FQDN.

The "Percentage-Hyphens-FQDN" feature's value is in [0, 1] and is the percentage of hyphen characters in the FQDN.

The "Percentage-NonCompliant-Characters-FQDN" feature's value is in [0, 1] and is the percentage of characters in the FQDN that may be non-compliant with RFC 1035, which says that characters should be alphabetical, numeric, hyphen "-", or dot ".".

"Direction-and-Breach-Category-X" are Boolean-valued features that may be 1 (True) if the event matches the directionality and breach of the category X; and 0 (False) otherwise. Directionality is one of Intrusion or Exfiltration, i.e., an inbound attack initiated from outside the protected network, or an outbound attack initiated from inside the protected network; and Breach is one of Allowed or Blocked, i.e., was the communication allowed (Allowed) to cross the network perimeter, or was the communication prevented (Blocked) from crossing the network perimeter by, for example, a network firewall or a CTI gateway. Thus, there may be four possible categories for X, namely {Intrusion, Allowed}, {Intrusion, Blocked}, {Exfiltration, Allowed}, and {Exfiltration, Blocked}, and therefore four (4) features named "Direction-and-Breach-Category-{X}". These features may affect reportability likelihood determinations because, for example, a cyberanalyst may be less likely to report an Intrusion event that was Blocked than to report an Exfiltration event that was Allowed.

Although not required, one of ordinary skill in the art will appreciate that various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing devices and one or more networks. The functionality may be distributed in any manner, or may be located in a single computing device (e.g., a server, a client computer, etc.).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional.

What is claimed is:
1. A method comprising:
receiving, by a system comprising one or more computing devices, training data comprising a plurality of analyzed event logs, wherein each of the analyzed event logs corresponds to a threat event and indicates characteristics of a communication matching one or more threat criteria, and wherein each of the analyzed event logs has been designated, by a human cyberanalyst, as one of reportable or non-reportable;

training a machine learned algorithm by inputting the analyzed event logs, wherein after the training, the trained machine learned algorithm is configured to output reportability likelihoods corresponding to inputs of event logs that are not part of the training data, and wherein each of the output reportability likelihoods represents a probability that a human cyberanalyst would report a detected threat event, corresponding to the input event log for which the reportability likelihood is output, if the detected threat event is investigated;

determining, using the trained machine learned algorithm, a reportability likelihood corresponding to a subsequent event log that is not part of the training data;

storing the subsequent event log with event logs having corresponding reportability likelihoods; and based on reportability likelihoods corresponding to a portion of the stored event logs, outputting the portion of the event logs.

2. The method of claim 1, wherein the training the machine learned algorithm comprises training the machine learned algorithm to:

output, based on inputs of reportable event logs, a first value;

output, based on inputs of non-reportable event logs, a second value; and output, as the reportability likelihoods corresponding to the inputs of the event logs that are not part of the training data, values between the first value and the second value, inclusive.

3. The method of claim 2, wherein the first value is 1 and the second value is 0.

4. The method of claim 1, wherein the determining the reportability likelihood corresponding to the subsequent event log comprises determining a combined reportability likelihood based on a first reportability likelihood determined for the subsequent event log using a static algorithm and based on a second reportability likelihood determined for the subsequent event log using the trained machine learned algorithm.

5. The method of claim 4, wherein the determining the reportability likelihood corresponding to the subsequent event log comprises selecting, as the reportability likelihood corresponding to the subsequent event log, a highest of the first reportability likelihood or the second reportability likelihood.

6. The method of claim 1, further comprising generating the training data by performing the following for each of a plurality of event logs:

determining a combined reportability likelihood based on a first reportability likelihood determined for the event log using a static algorithm and based on a second reportability likelihood determined for the event log using the machine learned algorithm;

storing the event log; and based on its combined reportability likelihood, outputting the event log for designation, by a human cyberanalyst, as reportable or non-reportable.

7. The method of claim 6, wherein the determining the combined reportability likelihood comprises, for each event log of the plurality of event logs, weighting to emphasize the static algorithm, and wherein the determining the reportability likelihood corresponding to the subsequent event log comprises:

determining, using the static algorithm, a first reportability likelihood for the subsequent event log;

determining, using the trained machine learned algorithm, a second reportability likelihood for the subsequent event log; and determining, using an updated weighting to emphasize the trained machine learned algorithm, a combined reportability likelihood based on the first reportability likelihood determined for the subsequent event log and based on the second reportability likelihood determined for the subsequent event log.

8. The method of claim 1, wherein the outputting the portion of the event logs comprises outputting the subsequent event log, the method further comprising:

receiving, as a subsequent analyzed event log, the subsequent event log with a designation, by a human cyberanalyst, of one of reportable or non-reportable; and further training the trained machine learned algorithm based on the subsequent analyzed event log.

9. The method of claim 1, further comprising:

based on reportability likelihoods, corresponding to event logs remaining in storage after the outputting of the portion of the event logs, being less than a threshold value, dropping the event logs remaining in storage.

10. The method of claim 1, wherein the outputting the portion of the event logs comprises:

sorting the event logs in a queue, based on their corresponding reportability likelihoods, so that an event log at a head of the queue corresponds to a highest reportability likelihood; and repeatedly outputting from the head of the queue.

11. The method of claim 1, further comprising:

determining, using the trained machine learned algorithm, a reportability likelihood corresponding to a second subsequent event log that is not part of the training data; and based on the reportability likelihood, corresponding to a second subsequent event log, being less than a threshold value, not sending the second subsequent event log for processing by a human cyberanalyst.

12. The method of claim 1, wherein the training data is specific to one or more of:

a particular organization, a particular network segment, or a particular human cyberanalyst.

13. A system of one or more computing devices comprising:

one or more processors; and memory storing instructions that, when executed by the one or more processors, cause the system to:

receive training data comprising a plurality of analyzed event logs, wherein each of the analyzed event logs corresponds to a threat event and indicates characteristics of a communication matching one or more threat criteria, and wherein each of the analyzed event logs has been designated, by a human cyberanalyst, as one of reportable or non-reportable;

train a machine learned algorithm by inputting the analyzed event logs, wherein after the training, the trained machine learned algorithm is configured to output reportability likelihoods corresponding to inputs of event logs that are not part of the training data, and wherein each of the output reportability likelihoods represents a probability that a human cyberanalyst would report a detected threat event, corresponding to the input event log for which the reportability likelihood is output, if the detected threat event is investigated;

determine, using the trained machine learned algorithm, a reportability likelihood corresponding to a subsequent event log that is not part of the training data;

store the subsequent event log with event logs having corresponding reportability likelihoods; and based on reportability likelihoods corresponding to a portion of the stored event logs, output the portion of the event logs.

14. The system of claim 13, wherein the instructions, when executed by the one or more processors, cause the system to train the machine learned algorithm by training the machine learned algorithm to:

output, based on inputs of reportable event logs, a first value;

output, based on inputs of non-reportable event logs, a second value; and output, as the reportability likelihoods corresponding to the inputs of the event logs that are not part of the training data, values between the first value and the second value, inclusive.

15. The system of claim 14, wherein the first value is 1 and the second value is 0.

16. The system of claim 13, wherein the instructions, when executed by the one or more processors, cause the system to determine the reportability likelihood corresponding to the subsequent event log by:

determining a first reportability likelihood for the subsequent event log using a static algorithm;

determining a second reportability likelihood for the subsequent event log using the trained machine learned algorithm; and selecting, as the reportability likelihood corresponding to the subsequent event log, a combined reportability likelihood comprising a highest of the first reportability likelihood or the second reportability likelihood.

17. The system of claim 13, wherein the instructions, when executed by the one or more processors, cause the system to generate the training data by performing the following for each of a plurality of event logs:

determining a combined reportability likelihood based on a first reportability likelihood determined for the event log using a static algorithm and based on a second reportability likelihood determined for the event log using the machine learned algorithm;

storing the event log; and based on its combined reportability likelihood, outputting the event log for designation, by a human cyberanalyst, as reportable or non-reportable.

18. The system of claim 17, wherein the instructions, when executed by the one or more processors, cause the system to determine the combined reportability likelihood, for each event log of the plurality of event logs, by weighting to emphasize the static algorithm, and wherein the instructions, when executed by the one or more processors, cause the system to determine the reportability likelihood corresponding to the subsequent event log by:

determining, using the static algorithm, a first reportability likelihood for the subsequent event log;

determining, using the trained machine learned algorithm, a second reportability likelihood for the subsequent event log; and determining, using an updated weighting to emphasize the trained machine learned algorithm, a combined reportability likelihood based on the first reportability likelihood determined for the subsequent event log and based on the second reportability likelihood determined for the subsequent event log.

19. The system of claim 13, wherein the instructions, when executed by the one or more processors, cause the system to output the portion of the event logs by outputting the subsequent event log, and wherein the instructions, when executed by the one or more processors, cause the system to:

receive, as a subsequent analyzed event log, the subsequent event log with a designation, by a human cyberanalyst, of one of reportable or non-reportable; and further train the trained machine learned algorithm based on the subsequent analyzed event log.

20. The system of claim 13, wherein the instructions, when executed by the one or more processors, cause the system to:

based on reportability likelihoods, corresponding to event logs remaining in storage after the outputting of the portion of the event logs, being less than a threshold value, drop the event logs remaining in storage.

21. The system of claim 13, wherein the instructions, when executed by the one or more processors, cause the system to output the portion of the event logs by:

sorting the event logs in a queue, based on their corresponding reportability likelihoods, so that an event log at a head of the queue corresponds to a highest reportability likelihood; and repeatedly outputting from the head of the queue.

22. One or more non-transitory computer-readable media having instructions stored thereon that, when executed by a system of one or more computing devices, cause the one or more computing devices to:

receive training data comprising a plurality of analyzed event logs, wherein each of the analyzed event logs corresponds to a threat event and indicates characteristics of a communication matching one or more threat criteria, and wherein each of the analyzed event logs has been designated, by a human cyberanalyst, as one of reportable or non-reportable;

train a machine learned algorithm by inputting the analyzed event logs, wherein after the training, the trained machine learned algorithm is configured to output reportability likelihoods corresponding to inputs of event logs that are not part of the training data, and wherein each of the output reportability likelihoods represents a probability that a human cyberanalyst would report a detected threat event, corresponding to the input event log for which the reportability likelihood is output, if the detected threat event is investigated;

determine, using the trained machine learned algorithm, a reportability likelihood corresponding to a subsequent event log that is not part of the training data;

store the subsequent event log with event logs having corresponding reportability likelihoods; and based on reportability likelihoods corresponding to a portion of the stored event logs, output the portion of the event logs.

23. The one or more non-transitory computer-readable media of claim 22, wherein the instructions, when executed, cause the system to train the machine learned algorithm by training the machine learned algorithm to:

output, based on inputs of reportable event logs, a first value;

output, based on inputs of non-reportable event logs, a second value; and output, as the reportability likelihoods corresponding to the inputs of the event logs that are not part of the training data, values between the first value and the second value, inclusive.

24. The one or more non-transitory computer-readable media of claim 23, wherein the first value is 1 and the second value is 0.

25. The one or more non-transitory computer-readable media of claim 22, wherein the instructions, when executed, cause the system to determine the reportability likelihood corresponding to the subsequent event log by:

determining a first reportability likelihood for the subsequent event log using a static algorithm;

determining a second reportability likelihood for the subsequent event log using the trained machine learned algorithm; and selecting, as the reportability likelihood corresponding to the subsequent event log, a combined reportability likelihood comprising a highest of the first reportability likelihood or the second reportability likelihood.

26. The one or more non-transitory computer-readable media of claim 22, wherein the instructions, when executed, cause the system to generate the training data by performing the following for each of a plurality of event logs:

determining a combined reportability likelihood based on a first reportability likelihood determined for the event log using a static algorithm and based on a second reportability likelihood determined for the event log using the machine learned algorithm;

storing the event log; and based on its combined reportability likelihood, outputting the event log for designation, by a human cyberanalyst, as reportable or non-reportable.

27. The one or more non-transitory computer-readable media of claim 26, wherein the instructions, when executed, cause the system to determine the combined reportability likelihood, for each event log of the plurality of event logs, by weighting to emphasize the static algorithm, and wherein the instructions, when executed, cause the system to determine the reportability likelihood corresponding to the subsequent event log by:

determining, using the static algorithm, a first reportability likelihood for the subsequent event log;

determining, using the trained machine learned algorithm, a second reportability likelihood for the subsequent event log; and determining, using an updated weighting to emphasize the trained machine learned algorithm, a combined reportability likelihood based on the first reportability likelihood determined for the subsequent event log and based on the second reportability likelihood determined for the subsequent event log.

28. The one or more non-transitory computer-readable media of claim 22, wherein the instructions, when executed, cause the system to output the portion of the event logs by outputting the subsequent event log, and wherein the instructions, when executed, cause the system to:

receive, as a subsequent analyzed event log, the subsequent event log with a designation, by a human cyberanalyst, of one of reportable or non-reportable; and further train the trained machine learned algorithm based on the subsequent analyzed event log.

29. The one or more non-transitory computer-readable media of claim 22, wherein the instructions, when executed, cause the system to:

based on reportability likelihoods, corresponding to event logs remaining in storage after the outputting of the portion of the event logs, being less than a threshold value, drop the event logs remaining in storage.

30. The one or more non-transitory computer-readable media of claim 22, wherein the instructions, when executed, cause the system to output the portion of the event logs by:

sorting the event logs in a queue, based on their corresponding reportability likelihoods, so that an event log at a head of the queue corresponds to a highest reportability likelihood; and repeatedly outputting from the head of the queue.

31. The system of claim 13, wherein the instructions, when executed by the one or more processors, cause the system to:

determine, using the trained machine learned algorithm, a reportability likelihood corresponding to a second subsequent event log that is not part of the training data; and based on the reportability likelihood, corresponding to a second subsequent event log, being less than a threshold value, not send the second subsequent event log for processing by a human cyberanalyst.

32. The system of claim 13, wherein the training data is specific to one or more of:

a particular organization, a particular network segment, or a particular human cyberanalyst.

33. The one or more non-transitory computer-readable media of claim 22, wherein the instructions, when executed, cause the system to:

determine, using the trained machine learned algorithm, a reportability likelihood corresponding to a second subsequent event log that is not part of the training data; and based on the reportability likelihood, corresponding to a second subsequent event log, being less than a threshold value, not send the second subsequent event log for processing by a human cyberanalyst.

34. The one or more non-transitory computer-readable media of claim 22, wherein the training data is specific to one or more of:

a particular organization, a particular network segment, or a particular human cyberanalyst.

* * * * *